(12) United States Patent
Yang et al.

(10) Patent No.: US 11,107,497 B1
(45) Date of Patent: Aug. 31, 2021

(54) RECORDING HEAD WITH FOCUSING STRUCTURE

(71) Applicant: Seagate Technology LLC, Cupertino, CA (US)

(72) Inventors: Ruoxi Yang, Plymouth, MN (US); YongJun Zhao, Eden Prairie, MN (US); Nan Zhou, Chanhassen, MN (US); Weibin Chen, Edina, MN (US); Huaqing Yin, Eden Prairie, MN (US); Michael Allen Seigler, Eden Prairie, MN (US)

(73) Assignee: Seagate Technology LLC, Fremont, CA (US)

(*) Notice: Subject to any disclaimer, the term of this patent is extended or adjusted under 35 U.S.C. 154(b) by 0 days.

(21) Appl. No.: 16/724,558

(22) Filed: Dec. 23, 2019

(51) Int. Cl.
| | |
|---|---|
| *G11B 7/1362* | (2012.01) |
| *G11B 5/60* | (2006.01) |
| *G11B 13/08* | (2006.01) |
| *G11B 5/31* | (2006.01) |
| *G11B 7/1387* | (2012.01) |
| *G11B 11/105* | (2006.01) |
| *G11B 5/00* | (2006.01) |

(52) U.S. Cl.
CPC ............ *G11B 5/6082* (2013.01); *G11B 5/314* (2013.01); *G11B 5/3106* (2013.01); *G11B 5/3133* (2013.01); *G11B 5/6088* (2013.01); *G11B 7/1362* (2013.01); *G11B 7/1387* (2013.01); *G11B 11/1058* (2013.01); *G11B 13/08* (2013.01); *G11B 2005/0021* (2013.01)

(58) Field of Classification Search
None
See application file for complete search history.

(56) References Cited

U.S. PATENT DOCUMENTS

| | | | |
|---|---|---|---|
| 6,795,630 | B2 | 9/2004 | Challener et al. |
| 8,451,705 | B2 * | 5/2013 | Peng .................... G11B 5/3133 360/59 |
| 8,897,105 | B1 | 11/2014 | Zuckerman et al. |
| 9,070,385 | B2 * | 6/2015 | Zuckerman .......... G11B 5/4866 |
| 9,196,278 | B1 * | 11/2015 | Tatah .................... G11B 5/4866 |
| 9,251,819 | B2 | 2/2016 | Peng |
| 9,322,997 | B2 | 4/2016 | Peng |
| 9,424,867 | B2 | 8/2016 | Peng |
| 9,679,594 | B1 * | 6/2017 | Peng .................... G11B 5/3106 |
| 9,837,112 | B2 * | 12/2017 | Yang .................... G11B 5/3133 |
| 9,852,753 | B2 | 12/2017 | Peng |
| 10,115,423 | B1 * | 10/2018 | Gubbins .............. G11B 5/6088 |
| 10,249,326 | B1 * | 4/2019 | Peng ...................... G11B 5/012 |

(Continued)

OTHER PUBLICATIONS

Peng et al., U.S. Appl. No. 16/714,933, filed Dec. 16, 2019.

*Primary Examiner* — William J Klimowicz
(74) *Attorney, Agent, or Firm* — Mueting Raasch Group

(57) ABSTRACT

A recording head includes a near-field transducer proximate a media-facing surface of the recording head and a waveguide that overlaps and delivers light to the near-field transducer. The recording head includes subwavelength-sized focusing mirror comprising first and second reflectors disposed on cross track sides of the near-field transducer. Each of the first and second reflectors is spaced apart from the media-facing surface by a distance, D, measured along an axis normal to the media-facing surface.

20 Claims, 28 Drawing Sheets

(56) References Cited

U.S. PATENT DOCUMENTS

| | | | | |
|---|---|---|---|---|
| 2007/0115787 A1* | 5/2007 | Itagi | ............... | G11B 5/314 |
| | | | | 369/99 |
| 2015/0325261 A1* | 11/2015 | Yang | ............... | G11B 5/3133 |
| | | | | 369/13.33 |
| 2017/0249962 A1* | 8/2017 | Peng | ............... | G11B 5/314 |

\* cited by examiner

RECORDING HEAD WITH FOCUSING STRUCTURE

SUMMARY

Embodiments of the disclosure are directed to a recording head that includes a near-field transducer proximate a media-facing surface of the recording head. A waveguide overlaps and delivers light to the near-field transducer. The recording head further includes a subwavelength-sized focusing mirror comprising first and second reflectors on cross track sides of the near-field transducer. Each of the first and second reflectors is spaced apart from the media-facing surface by a distance, D, measured along an axis normal to the media-facing surface. In certain embodiments, the space between the reflectors and media-facing surface can be filled with appropriate dielectric or metallic materials, same as or different from, the reflector body.

Further embodiments are directed to a recording head that includes a near-field transducer proximate a media-facing surface of the recording head. A waveguide overlaps and delivers light to the near-field transducer. A subwavelength focusing mirror of the recording head is spaced apart from the media-facing surface by a distance, D, as measured along an axis normal to the media-facing surface. The subwavelength focusing mirror comprises first and second reflectors disposed on cross track sides of the near-field transducer. The distance D is about 5% to about 10% of the height of the near-field transducer as measured along the axis normal to the media-facing surface.

The above summary is not intended to describe each disclosed embodiment or every implementation of the present disclosure. The figures and the detailed description below more particularly exemplify illustrative embodiments.

BRIEF DESCRIPTION OF THE DRAWINGS

The discussion below refers to the following figures, wherein the same reference number may be used to identify the similar/same component in multiple figures. However, the use of a number to refer to a component in a given figure is not intended to limit the component in another figure labeled with the same number. The figures are not necessarily to scale.

DETAILED DESCRIPTION

The present disclosure is generally related to heat-assisted magnetic recording (HAMR), also referred to as energy-assisted magnetic recording (EAMR), thermally-assisted recording (TAR), thermally-assisted magnetic recording (TAMR), etc. In a HAMR device, a near-field transducer (NFT) concentrates optical energy into a tiny optical spot in a recording layer, which raises the media temperature locally, reducing the writing magnetic field required for high-density recording. A waveguide delivers light to the near-field transducer and excites the near-field transducer.

The following disclosure is directed to components that improve near-field transducer performance (efficiency, thermal gradient, etc.) of a recording head. One of these components is a subwavelength-sized focusing mirror that recycles optical energy residing in the waveguide near the distal end of the near-field transducer. For an optical system integrated with a near-field transducer excited with a first higher-order transverse electric mode ($TE_{10}$), the focusing mirror converts the residual transverse electric field component to a longitudinal one to boost the near-field performance.

The focusing mirror can include first and second reflectors disposed on cross track sides of the near-field transducer and spaced apart from the media-facing surface of the recording head. When the first and second reflectors extend to the media-facing surface, especially with the reflectors forming a sharp angle with the media-facing surface, they may be subject to degradation, such as deformation and scratching during operation. A recording head having first and second reflectors that are spaced apart from the media-facing surface, or having a right-angle extension at the media-facing surface, reduces this degradation while providing acceptable recycling of optical energy.

Figure 1:
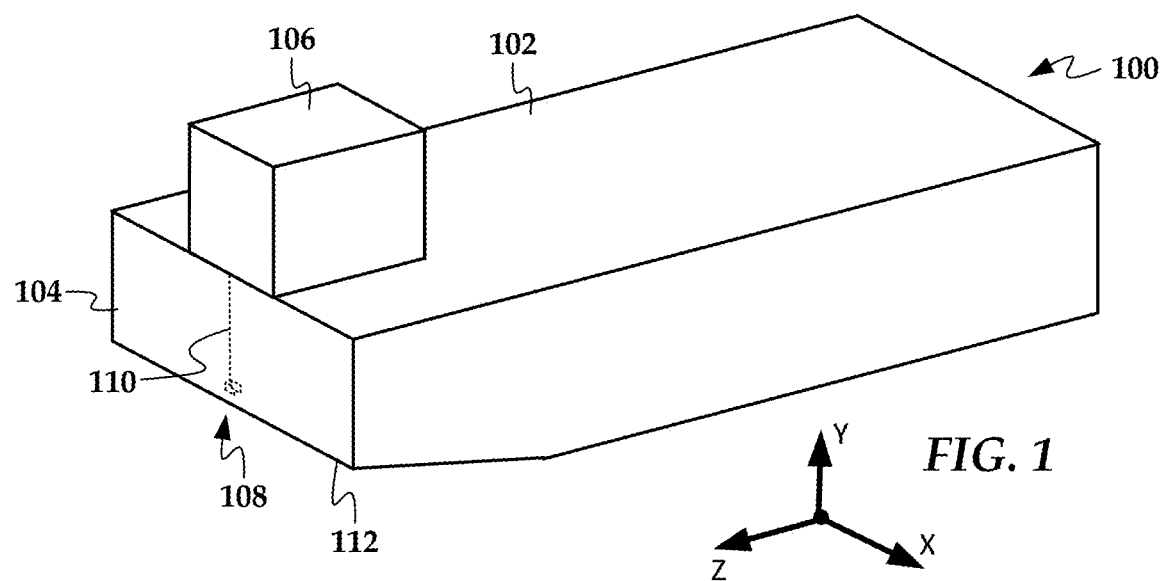
FIG. 1 is a perspective view of a slider assembly according to an example embodiment.

In reference now to FIG. 1, a perspective view shows a read/write head 100 according to an example embodiment. The read/write head 100 may be used in a magnetic data storage device, e.g., HAMR hard disk drive. The read/write head 100 may also be referred to herein interchangeably as a slider, write head, read head, recording head, etc. The read/write head 100 has a slider body 102 with read/write transducers 108 at a trailing edge 104 that are held proximate to a surface of a magnetic recording medium (not shown), e.g., a magnetic disk.

The illustrated read/write head 100 is configured as a HAMR device, and so includes additional components that form a hot spot on the recording medium near the read/write transducers 108. These HAMR components include an energy source 106 (e.g., laser diode) and a waveguide 110. The waveguide 110 delivers electromagnetic energy from the energy source 106 to a NFT that is part of the read/write transducers 108. The NFT achieves surface plasmon resonance and directs the energy out of a media-facing surface 112 to create a small hot spot on the recording medium.

Heat assisted magnetic recording uses a NFT to concentrate optical energy into a tiny optical spot in a recording layer, which raises the media temperature locally, reducing the writing magnetic field required for high-density recording. The waveguide 110 delivers light to the NFT and excites the NFT. Near-field transducers described herein may use an optical antenna with a protruded tip (e.g., peg). However, the embodiments described herein may be applicable to other types of near-field transducers, such as an elongated pin, subwavelength metallic aperture, metallic plates with a gap therebetween, etc.

An optical antenna works by taking advantage of excitation of local surface-plasmon (LSP) at the interface between a plasmonic metal of free electrons and a dielectric material. The size of an optical antenna is designed to reach LSP at a desired light wavelength. On resonance, optical energy from the waveguide can be concentrated into a local volume; field-line concentration occurs at a local shape singularity, such as a gap or a tip, due to the collective oscillations of electrons in the metal, which increases the interaction between light and matter.

The coupling between the propagating waves in the waveguide and the optical antenna is usually not complete, due to impedance mismatch between the propagating waveguide waves and the localized, enhanced fields. Therefore, some fields still reside in the waveguide at the distal end of the near-field transducer in close proximity to a recording medium. Part of these fields will be absorbed in the recording medium, causing background heating and degrading the recording performance. One way to mitigate the background heating is to use a metallic blocker or optical shield near the media-facing surface. Embodiments described below re-use those residual fields to improve the near-field transducer performance. For example, a mirrored waveguide focusing mirror may be disposed near the distal end of the near-field transducer. The focusing mirror includes first and second reflectors disposed on cross track sides of the near-field transducer. This focusing mirror improves near-field transducer recording performance.

Figure 2:
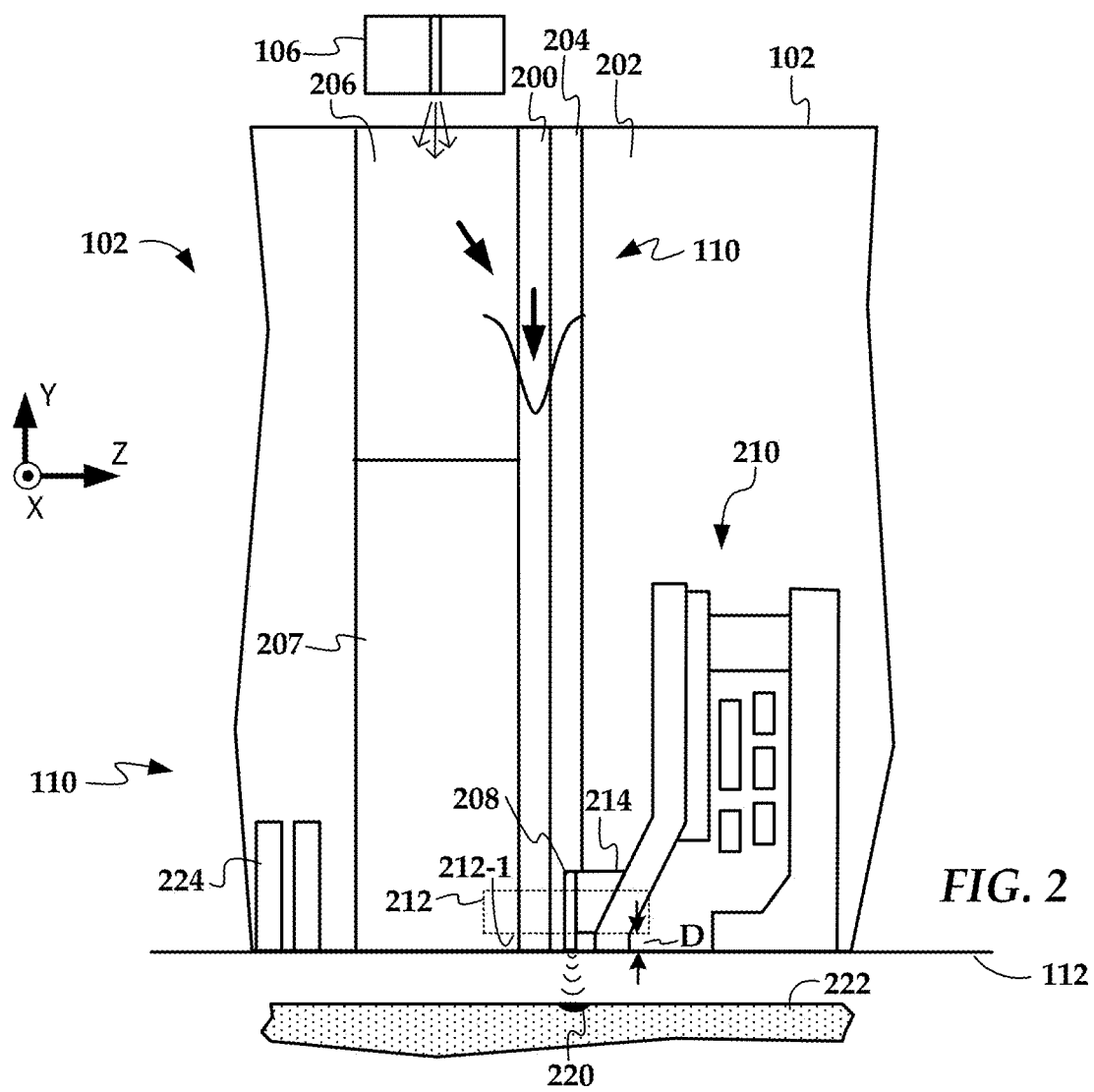
FIG. 2 is a cross-sectional view of a slider along a down-track plane according to an example embodiment.
Figure 3:
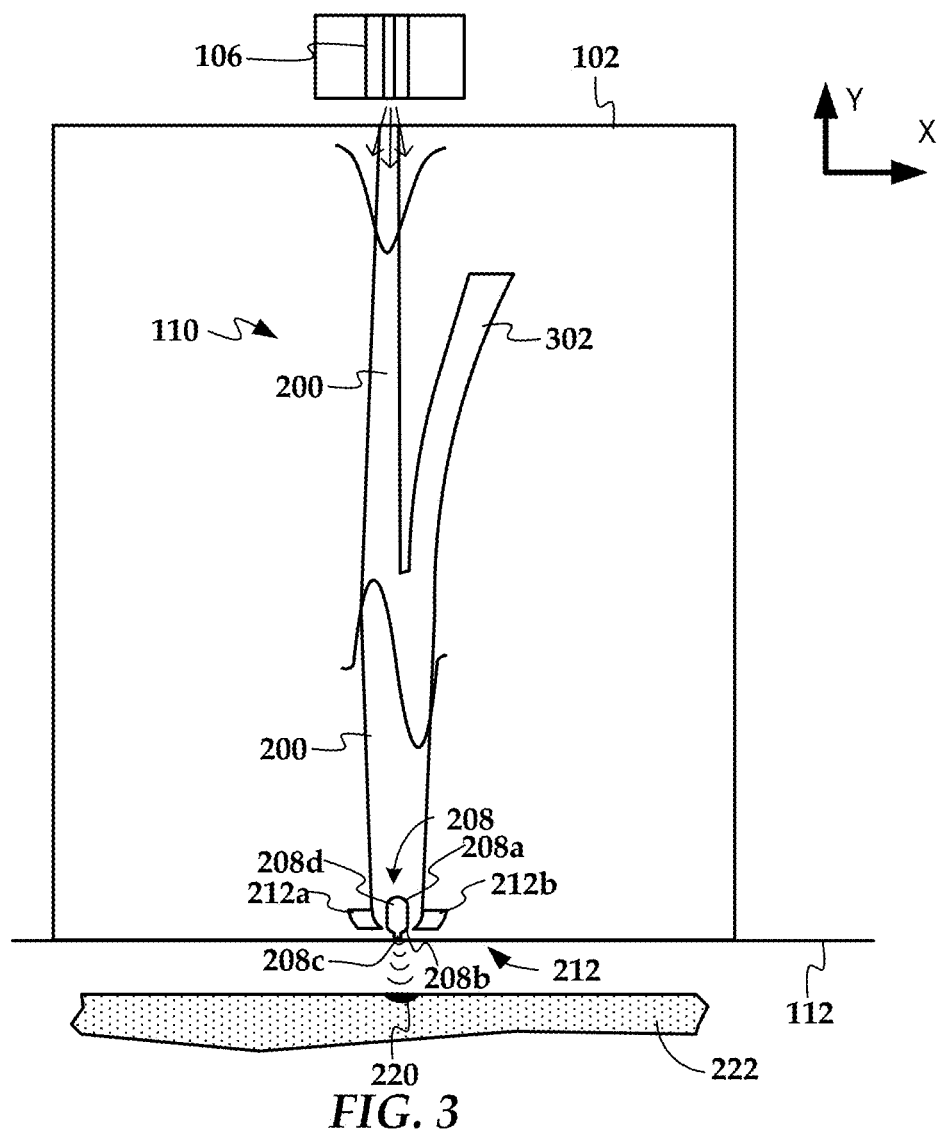
FIG. 3 is a wafer plane view of a slider according to an example embodiment.
Figure 4:
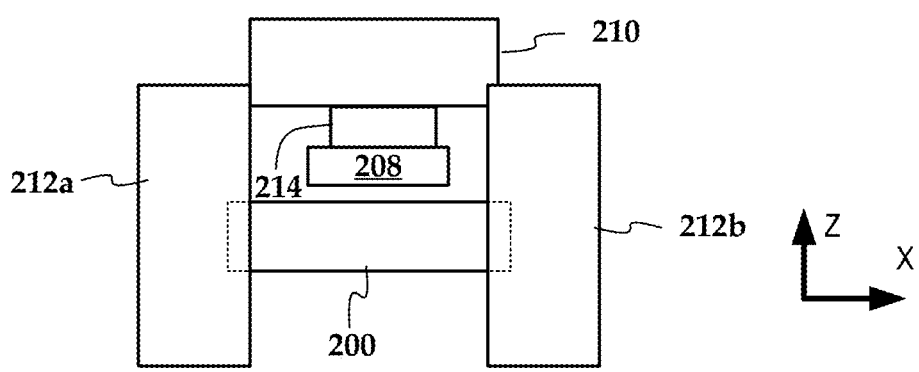
FIG. 4 is a media-facing surface view of a slider according to an example embodiment.

In FIGS. 2-4, respective cross-sectional, wafer plane, and ABS views of the slider body 102 show a light delivery system according to an example embodiment. The slider body includes an NFT 208, a magnetic writer 210 and a micro-sized focusing mirror 212 having first and second reflectors 212a, 212b. As shown in FIG. 2, the side 212-1 of the focusing mirror 212 proximate to the media-facing surface 112 is spaced apart from the media-facing surface 112 by a distance, D, measured along an axis normal to the media-facing surface 112.

Light, emitted from the laser diode 106, is coupled into a three-dimensional, single mode channel waveguide 110 by a waveguide input coupler 206, which directs the light to a waveguide core 200. The input coupler 206 is replaced by a bottom cladding layer 207 towards the media-facing surface 112. A fundamental transverse electric mode, $TE_{00}$, is excited and propagates along the waveguide 110. The excited $TE_{00}$ mode, is then converted into a first higher-order mode, $TE_{10}$, of a two or a few modes waveguide with an assistant branch waveguide 302, as described, for example, in commonly-owned U.S. Pat. No. 9,322,997, dated Apr. 26, 2016.

The NFT 208 may have a main region 208d and a protruded peg 208c. The main region 208d may have two curved, two flatted, or one curved and the other one flatted ends 208a, 208b. The NFT 208 is placed proximate a side cladding layer 204 and top cladding layer 202 of the waveguide 110 and near the waveguide core 200. The NFT 208 could be also placed into the waveguide core 200. For additional details, see commonly-owned U.S. Pat. No. 9,251,819, dated Feb. 2, 2016. The NFT 208 is very small (e.g., on the order of 0.1 to a few light wavelengths, or any value therebetween) and achieves plasmonic resonance in response to the light coupled via the waveguide 110. The NFT creates a localized region of high power density (e.g., a small hot spot 220) on a recording medium 222 through an electromagnetic interaction during recording. This results in a high temperature rise in the hot spot 220, with the region reaching or exceeding the Curie temperature (Tc) and having dimensions less than 100 nm (e.g., ~50 nm).

A magnetic reader 224 is shown down-track from the NFT 208 and writer 210. The magnetic reader 224 may include a magneto-resistive stack that changes resistance in response to changes in magnetic field detected from the recording medium 222. These changes in magnetic field are converted to data by a read channel of the apparatus (e.g., hard disk drive assembly).

The waveguide core 200 can be made of dielectric materials of high index of refraction, for instance, $Ta_2O_5$ (tantalum oxide), $TiO_2$ (titanium oxide), $Nb_2O_5$ (niobium oxide), $Si_3N_4$ (silicon nitride), SiC (silicon carbon), $Y_2O_3$ (yttrium oxide), ZnSe (zinc selenide), ZnS (zinc sulfide), ZnTe (zinc telluride), $Ba_4Ti_3O_{12}$ (barium titanate), GaP (gallium phosphide), $CuO_2$ (copper oxide), and Si (silicon). The cladding layers 202, 204, 207 are each formed of a dielectric material having a refractive index lower than the core, such as, $Al_2O_3$ (aluminum oxide), SiO, and $SiO_2$ (silica). The material for the near-field transducer 208 has negative permittivity, such as Au, Ag, Cu, Al, Rh, Ir, Pt, etc. Suitable materials for the first and second reflectors 212a, 212b of the focusing mirror 212 include optically reflective materials such as Au, Ag, Rh, and Cu, for example.

Figure 5:
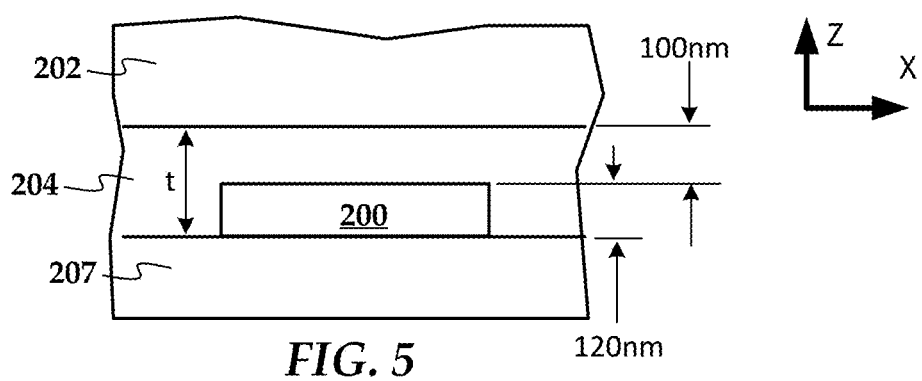
FIG. 5 is a cross-sectional view of waveguide according to an example embodiment.
Figure 6:
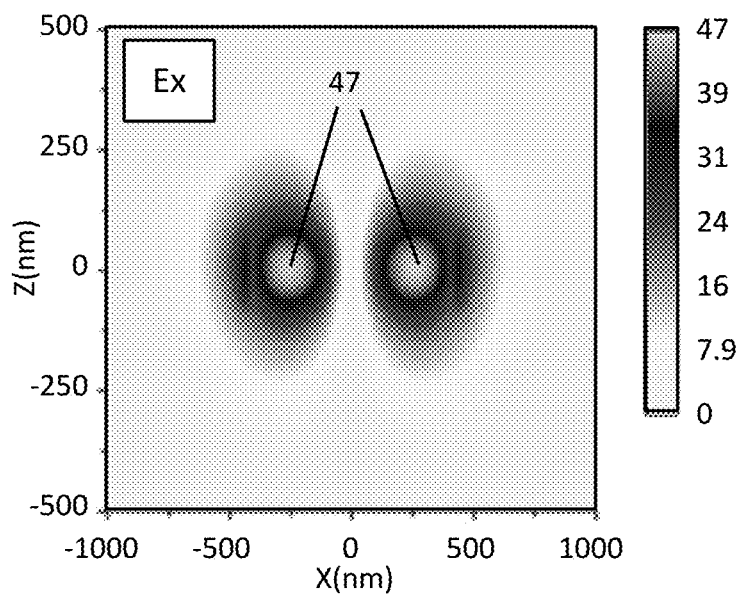
FIGS. 6 and 7 are electric field amplitude profiles for coupling a waveguide with a near-field transducer coupling according to an example embodiment.
Figure 7:
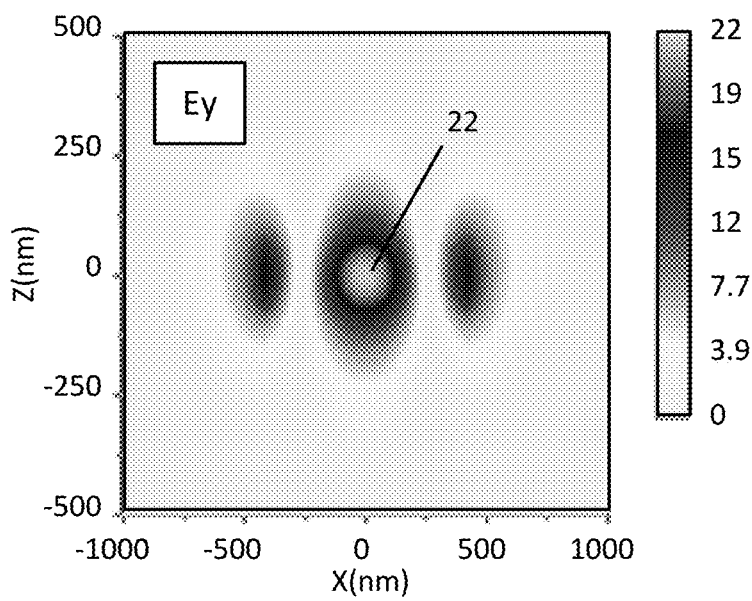

As an example, consider a waveguide with a 120 nm thick (along the z-direction) niobium oxide ($Nb_2O_5$) core of refractive index n=2.29, surrounded with silica ($SiO_2$, n=1.46) bottom and top cladding layer and with alumina ($Al_2O_3$, n=1.63) side cladding, as shown in the cross-sectional view of FIG. 5. The side cladding 204 is 220 nm thick (t). In certain embodiments the core width for NFT efficiency (without the presence of a focusing mirror) is 850 nm along the x-direction for a light wavelength ($\lambda$) of 830 nm. The profiles of FIGS. 6 and 7 show the amplitude of the two dominant electric field components and the physical mechanism for the NFT-TE$_{10}$ mode coupling. The TE$_{10}$ mode has two lobes in the transverse electric field Ex and three lobes in the longitudinal electric field component E$_y$.

Figure 8:
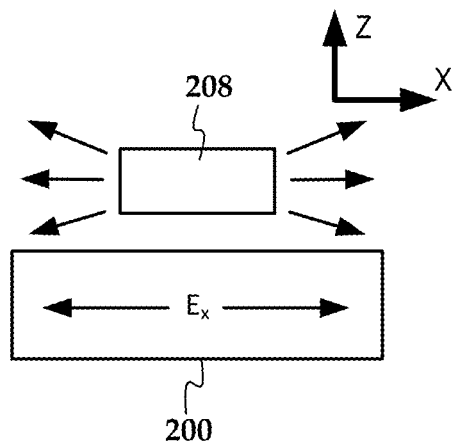
FIGS. 8 and 9 are diagrams showing transverse and longitudinal field excitation in a waveguide core and near-field transducer according to an example embodiment.
Figure 9:
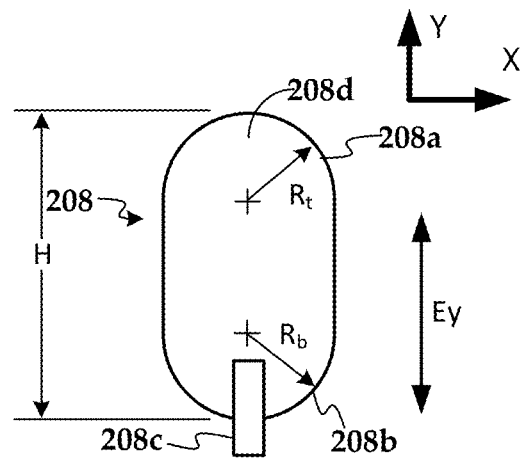

In FIG. 8, a diagram shows the transverse field (Ex) excitation in the core 200 and NFT 208. In FIG. 9, a diagram shows longitudinal (E$_y$) excitation in the NFT 208, along with NFT dimensions. In Ex, the two lobes have a π phase difference; in E$_y$, the central lobe is dominant in intensity while the two side lobes are centered at the interface between the waveguide core and side cladding. The transverse electric field Ex excites a local. surface plasmon along the circumference of the main body of the near-field transducer, funneling to the peg 208c, The NFT dimension and shape, e.g., the end curvatures R$_b$ and R$_t$, height H, are optimized to have far-field radiation patterns that match the waveguide mode as closely as possible for efficiency. The longitudinal electric field component E$_y$ drives the electric charges to the protruded peg 208c, resulting in a rod-lightning effect. The NET main body and the peg form a resonator to generate a confined hot spot in a recording medium.

Modeling shows that efficient excitation of the NFT prefers to have the peak magnitude of the longitudinal component E$_y$ be more or less equal to that of the transverse component $$Ex, \left|\frac{E_y}{E_x}\right| \geq 1.$$

This requirement is usually not fulfilled with a channel waveguide. For instance, in FIGS. 6 and 7, $$\left|\frac{E_y}{E_x}\right| = \frac{22}{47} = 0.47.$$

A waveguide having high contrast in the index of refraction between the core and cladding yields greater E$_y$. In U.S. Pat. No. 9,424,867, dated Aug. 23, 2016, an interferometric method is proposed to increase this ratio by converting a portion of the TE$_{10}$ mode into the fundamental transverse magnetic TM$_{00}$ mode in the waveguide. The longitudinal component E$_y$ is enhanced at the peg location when the phase difference between TE$_{10}$ and TM$_{00}$ mode at the peg location is appropriate, yielding a 40-50% improvement in NFT efficiency. However, the TM$_{00}$ mode does not efficiently interact with the near-field transducer (which is designed for TE$_{10}$ mode), leading to a loss of energy as well as thermal gradient.

Note that the NFT-TE$_{10}$ mode coupling is not complete. There is still a significant amount of field remaining in the waveguide. Embodiments described herein use these residual fields and convert them into a longitudinal component near the peg position to boost the NFT performance. This involves using a subwavelength-sized focusing mirror 212. Examples of such focusing mirrors include, but aren't limited to, a parabolic mirror, an elliptic mirror, and an aspherical mirror, etched into the waveguide from the top cladding and/or core, to the bottom cladding at the waveguide end to transform those residual transverse fields into a longitudinal field. The etched regions are metallized to provide reflective surfaces, resulting in what is sometimes referred to as a solid-immersion mirror. This focusing mirror 212 should be small, which minimizes the disturbance of the NFT-TE$_{10}$ mode coupling. As seen in FIGS. 3 and 4, the mirror 212 includes first and second reflectors 212a, 212b disposed on either side of and facing the NFT 208. Note that for the 830 nm light wavelength used in this modeling, the subwavelength mirror 212 will be submicron-sized. A conventional lens or mirror for focusing is usually much larger than one wavelength.

Figure 10:
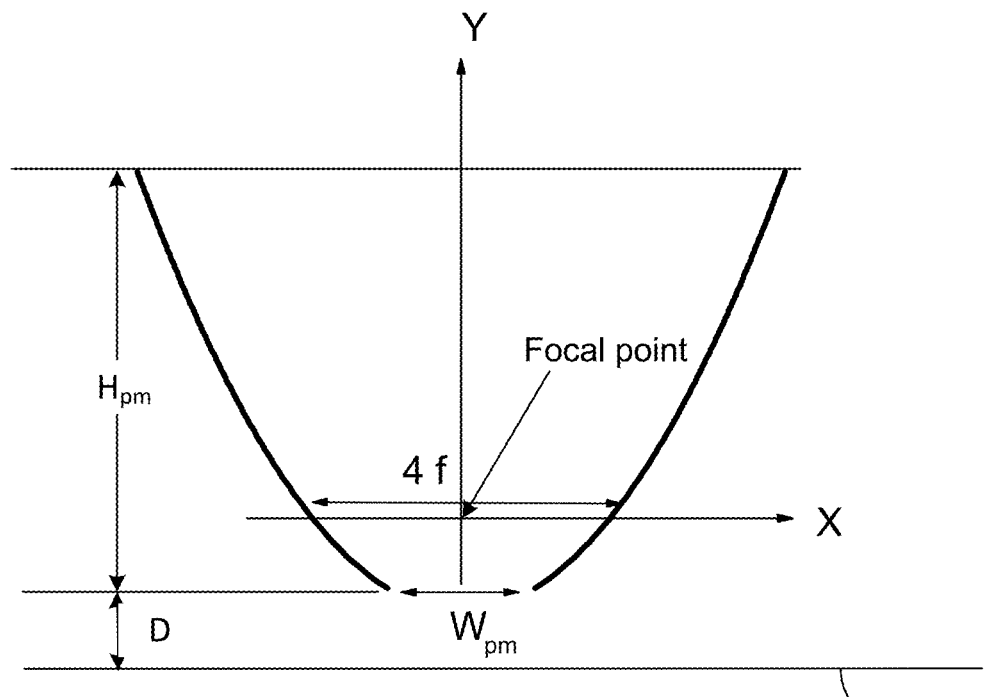
FIG. 10 is a diagram showing the shape of a parabolic mirror according to an example embodiment.

To demonstrate this idea, a parabolic mirror as a focusing lens is considered, as shown in the diagram of FIG. 10. The shape of a parabolic mirror is determined by its paraxial focal length, f. It has a bottom opening, W$_{pm}$, which is spaced apart from the distal end of the NET peg, e.g., by the distance D, and a height H$_{pm}$ away from the media-facing surface. The focusing mirror is usually shorter than and away from the NET to minimize its impact. to the waveguide mode-NET coupling. The dimensions of the mirror, including f, W$_{pm}$, and H$_{pm}$, can be determined to achieve certain figures of meth, such as the NFT efficiency and the thermal gradient. Here the NFT efficiency is used as the figure of merit, defined as the light absorption in the recording layer in a 50 nm by 50 nm square area through the recording layer.

As illustrated in FIG. 9, without a focusing mirror, the NFT may have the following dimensions: end radius of curvature R$_b$=R$_t$=200 nm, height H=600 nm. The peg dimension may be 40-nm wide along x-direction (cross-track), 30-nm thick along the z-direction (down-track), and the end of the peg 208c is 20-nm away from the media-facing surface (along the y-direction). Along the z-direction, the NFT 208 is placed 20-nm away from the core 200. The magnetic pole is slanted at 26° from the y-direction and connected with the NFT by a heat-sink 214. Both NFT 208 and NFT heat-sink 214 use gold, n=0.188+j 5.39. The pole is 200 nm wide along the x direction and wrapped with a chromium heat sink. The total width (along the x-direction) of the pole plus the chromium heat-sink is 600 nm. The heat-sink/pole is truncated at the far-end of the NFT 208. The NFT-pole spacing (NPS) at the media-facing surface is 20 nm.

This example assumes a recording medium is formed of an FePt layer (12.6 nm thick, complex refractive index n=2.55+j 2.72), a MgO layer (10 nm thick, n=1.70), and a heat-sink Cu layer (60 nm thick, n=0.26+j 5.29) on a glass substrate. The head-medium spacing is 8 nm with an effective index, n=1.21. For thermal modeling, the light absorption inside the medium is treated as the heat source for the temperature rise. The following parameters are assumed for the recording medium: specific heat C=4.19 J/cm$^3$/K, in-plane thermal conductivity K=0.05 J/cm/s/K, out-of-plane K=5 for the FePt layer; C=3.14 and K=0.052 for the MgO layer; C=3.49 and K=2 for the Cu heat-sink layer; and C=1.64 and K=0.01 for the glass substrate.

Figure 11:
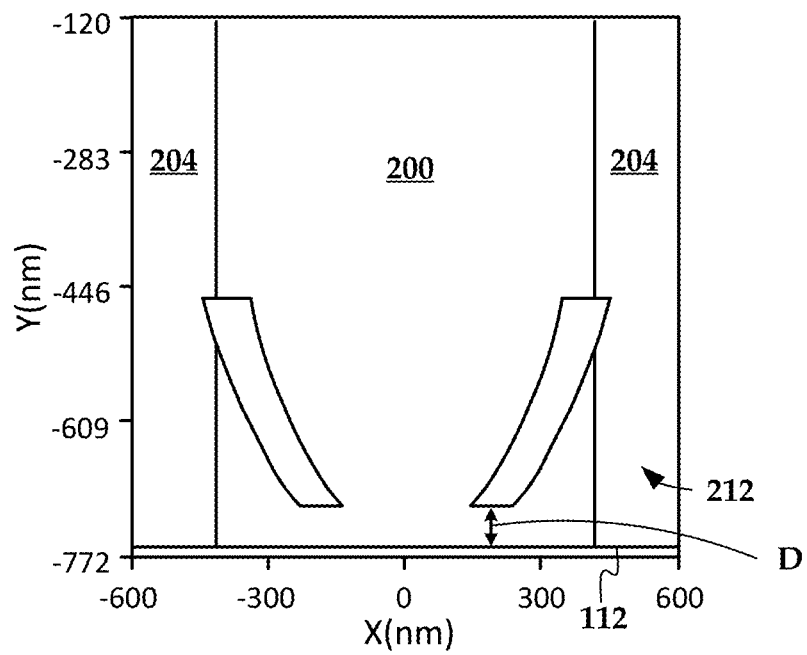
FIGS. 11 and 12 are diagrams showing details of a mirror, near-field transducer, and waveguide according to example embodiments.
Figure 12:
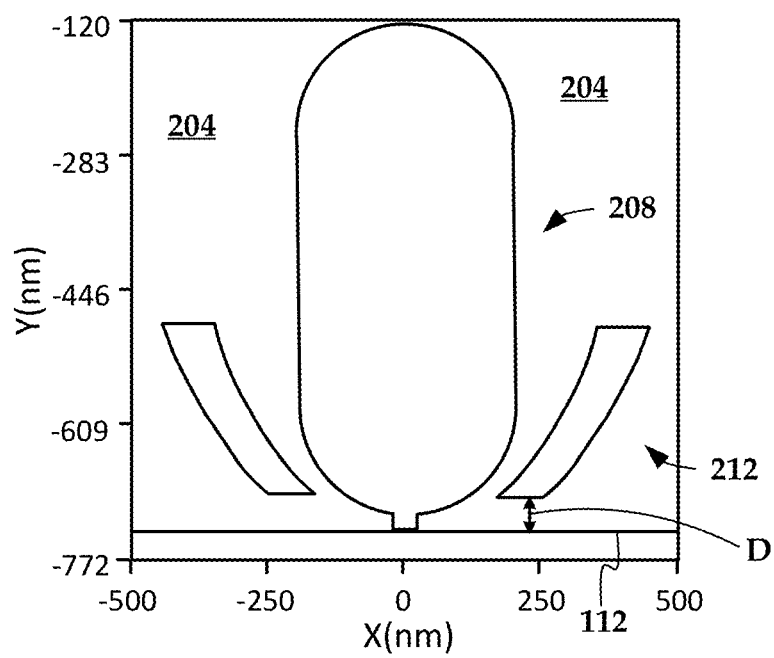

In FIGS. 11 and 12, diagrams show additional dimensional details of the focusing mirror, waveguide, and NFT proximate the media-facing surface. The views in FIGS. 11 and 12 are on planes parallel to the wafer substrate surface. In FIG. 11, the view is of the focusing mirror at the core plane. In FIG. 12, the view is of the focusing mirror at the core plane with the NFT. Note that the first and second reflectors 212a, 212b of the mirror 212 are usually shorter than a length of the NFT along the y-direction. Along the x-direction, the reflecting surfaces are thicker than the skin-depth of the material used for the mirror. The mirror's shape is determined by its paraxial focal length, f. The mirror 212 is centered at the near-field transducer 208. At the geometrical focal plane, the mirror has a width of 4 f along the x-direction. The mirror's dimension is determined by its bottom opening, W$_{pm}$, and height H$_{pm}$. One example has f=0.1 μm, bottom opening $W_{pm}$=0.28 μm, and height $H_{pm}$=0.238 μm. In some embodiments, the mirror height, $H_{pm}$, is 200-400 nm, and the height of the NFT is about 600 nm.

Figure 13:
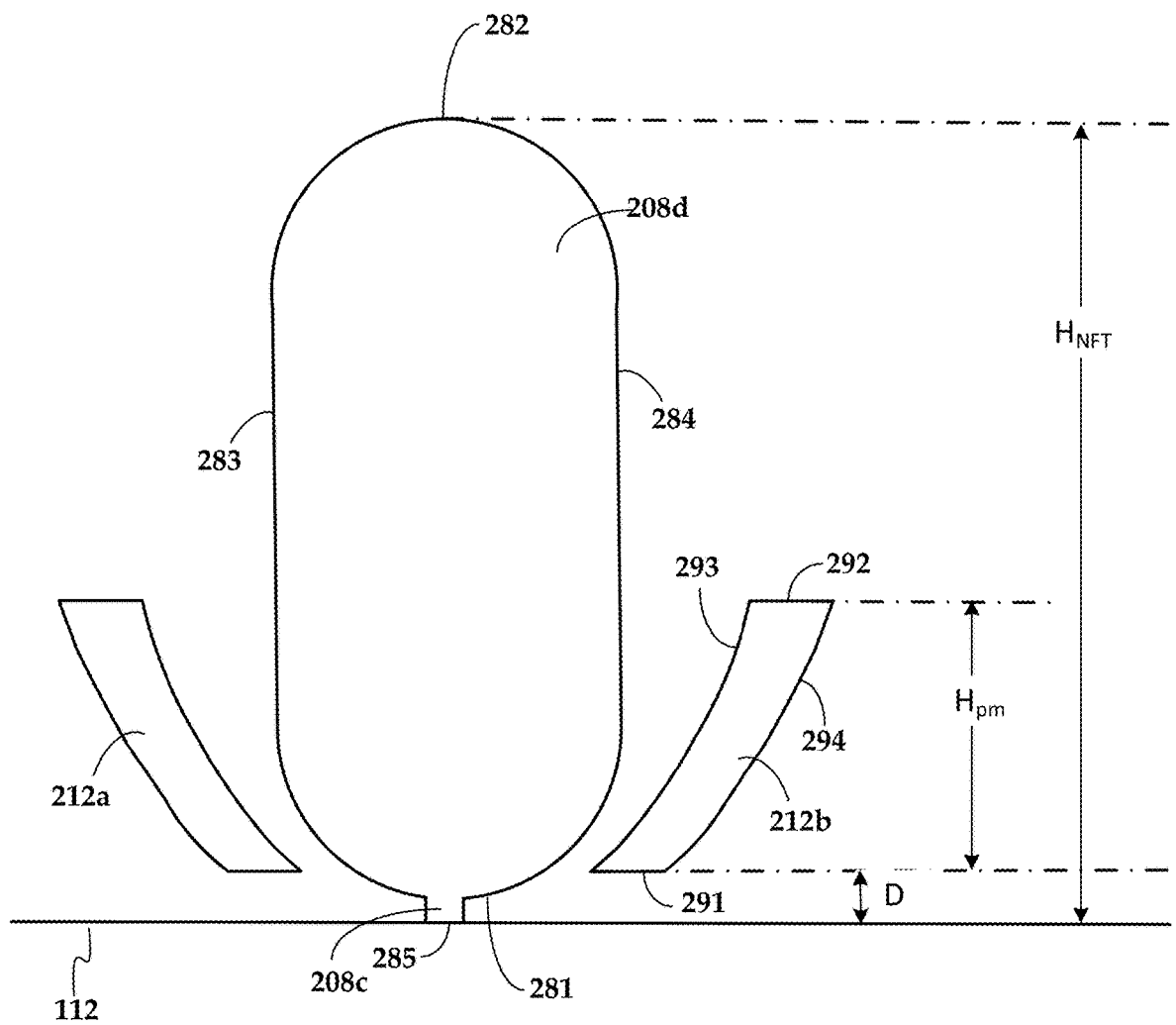
FIG. 13 shows various dimensions of a focusing mirror and near-field transducer according to example embodiments.

FIG. 13 is a view of the NFT 208 and focusing mirror 212 at the core plane, illustrating various dimensions of the NFT 208 and focusing mirror 212. The focusing mirror includes a first reflector 212a and a second reflector 212b. As illustrated in FIG. 13, in the core plane, the main body of the NFT 208 has a first side 281 proximate to the media-facing surface 112 and an opposite second side 282. The NFT has a third side 283 proximate to the first reflector 212a and an opposite fourth side 284 proximate to the second reflector 212b. Each of the reflectors 212a, 212b includes a first side 291 proximate to the media-facing surface 212 and an opposite second side 292. Each of the reflectors 212a, 212b includes a third side 293 proximate to the NFT 208 and an opposing fourth side 294. The first and second reflectors 212a, 212b are disposed on cross track sides 283, 284 of the NFT 208 such that the third side 293 of the first reflector 212a is proximate to the third side 283 of the NFT 208 and the third side 293 of the second reflector 212b is proximate to the fourth side 284 of the NFT 208. In various embodiments, D may be between about 10 nm and about 60 nm, between about 20 nm and about 50 nm, or between about 15 nm and about 40 nm. The NFT 208 may extend farther away from the media-facing surface 112 than the first and second reflectors as measured along an axis normal to the media-facing surface 112.

As depicted in FIG. 13, the NFT 208 may comprise a main body 208d and a peg 208c. The NFT 208 can be arranged such that the end 285 of the peg 208c is proximate to the media-facing surface 112. According to some embodiments, one or both of the first reflector 212a and the second reflector 212b has a first side 291 proximate to the media-facing surface 112. In various embodiments, the end of the peg 208c can be closer to the media-facing surface 112 than the first side 291 of the reflectors 212a, 212b; about the same distance from the media-facing surface as the first side 291 of the reflectors 212a, 212b; or farther from the media-facing surface 112 than the first side 291 of the reflectors 212a, 212b.

The height, $H_{pm}$, of the first reflector 212a (or the second reflector 212b) added to D may be less than the height, $H_{NFT}$, of the NFT 208. For example, $H_{pm}$ may be about 40%, 50%, or greater than 50%, e.g., about 60% of $H_{NFT}$. In some embodiments, D may be about 5% to about 10% of the height, $H_{NFT}$, of the near-field transducer as measured along the axis normal to the media-facing surface.

The third sides 293 of the first and second reflectors 212a, 212b that face the NFT 208 may have any suitable shape. As depicted in FIGS. 14A-FIG. 16B, the sides 293 may be straight (FIGS. 14A-B), or curved (FIGS. 15A-16B). If curved, the sides 293 may be parabolic (FIGS. 15A-B) or circular (FIG. 16A-B). In some embodiments, the sides 293 of the first and second reflectors 212a, 212b may substantially follow the contour of the sides 283, 284 of the NFT 208.

Figure 14A:
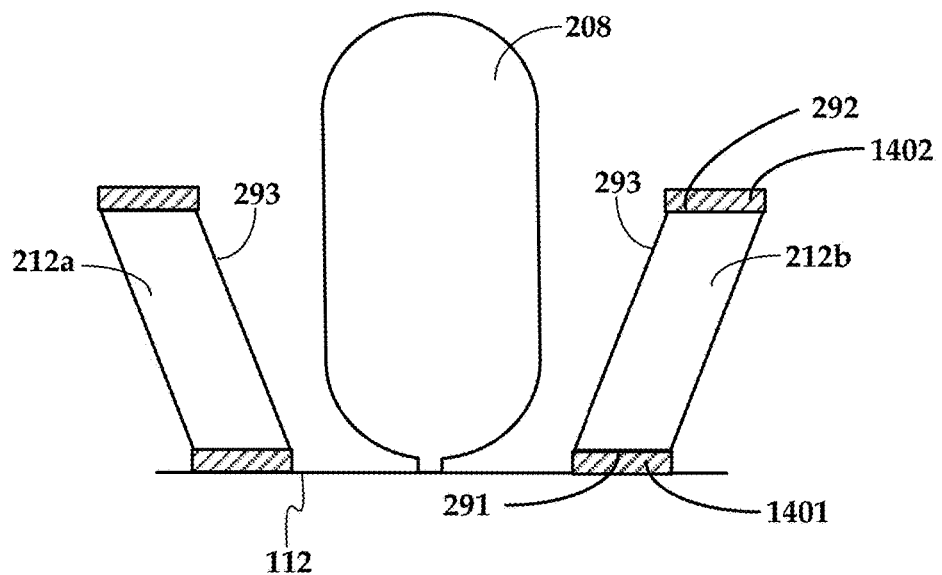
FIGS. 14A-16C illustrate various shapes for first and second reflectors of a focusing mirror according to example embodiments.

As indicated in FIG. 14A, there are first regions 1401 disposed between the first surfaces 291 of the first and second reflectors 212a, 212b and the media-facing surface 112. In some embodiments, the high-index core material of the waveguide is disposed in one or both of the first regions 1401. There is a second region 1402 proximate to the second surfaces 292 of the first and second reflectors 212a, 212b. The high-index core material of the waveguide may alternatively or additionally be disposed in the second regions 1402.

In some embodiments, the material disposed in the first regions 1401 and/or the second regions 1402 may have a refractive index lower that the core material of the waveguide. For example, the material disposed in the first 1401 and/or second 1402 regions may be, or comprise, AlO or may be, or comprise, SiO.

In some embodiments, the material or materials of the first and/or second regions 1401, 1402 may be the same as the material or materials of the reflecting pieces 212a, 212b. Alternatively, the material or materials of the first and/or second regions 1401, 1402 may be different from the material or materials of the reflecting pieces 212a, 212b.

Figure 14B:
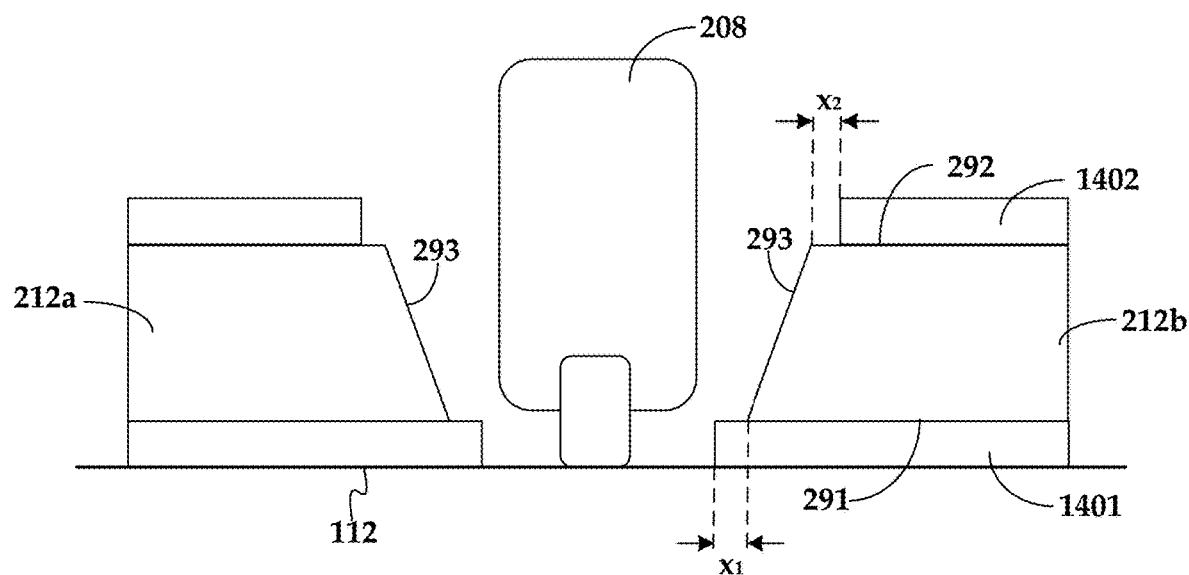

FIG. 14B illustrates an embodiment in which the first and second regions 1401, 1402 have a lateral displacement, $x_1$, $x_2$ relative to the reflectors 212a, 212b. FIG. 14B shows the first region 1401 laterally displaced toward the NFT 208 relative to the reflectors 212a, 212b by a distance $x_1$. The second region 1402 is laterally displaced away from the NFT 208 relative to the reflectors 212a, 212b by a distance $x_2$. The lateral displacement of the first and/or second regions 1401, 1402 relative to the reflectors 212a, 212b may be either inward (toward) the NFT (e.g., 1401) or outward (away from) the NFT 208 (e.g., 1402). The distances $x_1$ and $x_2$ can be between about 10 nm to about 100 nm, for example. In some embodiments, there may be no lateral displacement of the first region and/or second regions with respect to the reflectors. In some embodiments, the first and/or second regions may be made of the same material as the reflectors. Alternatively, the material of the first and/or second regions may be different from the material of the reflectors.

Figure 16A:
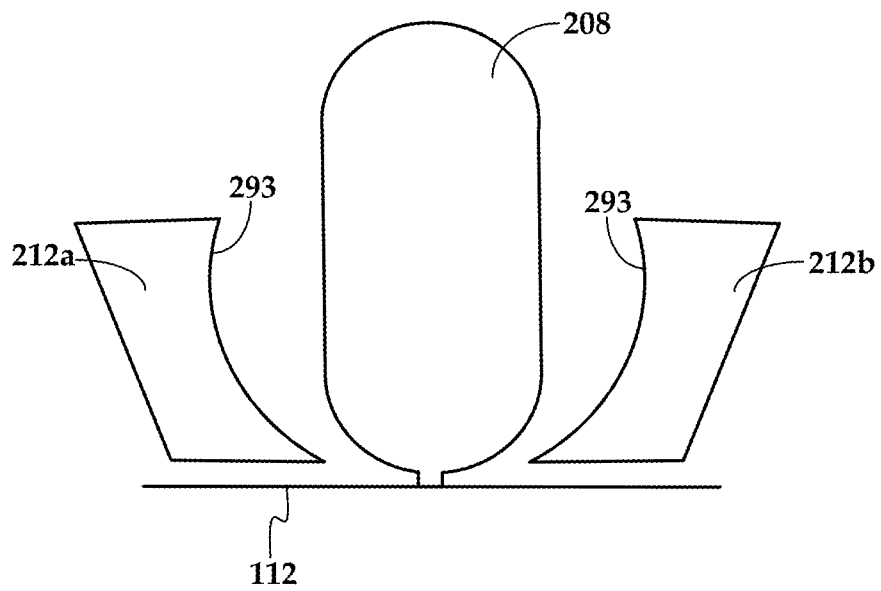
Figure 16B:
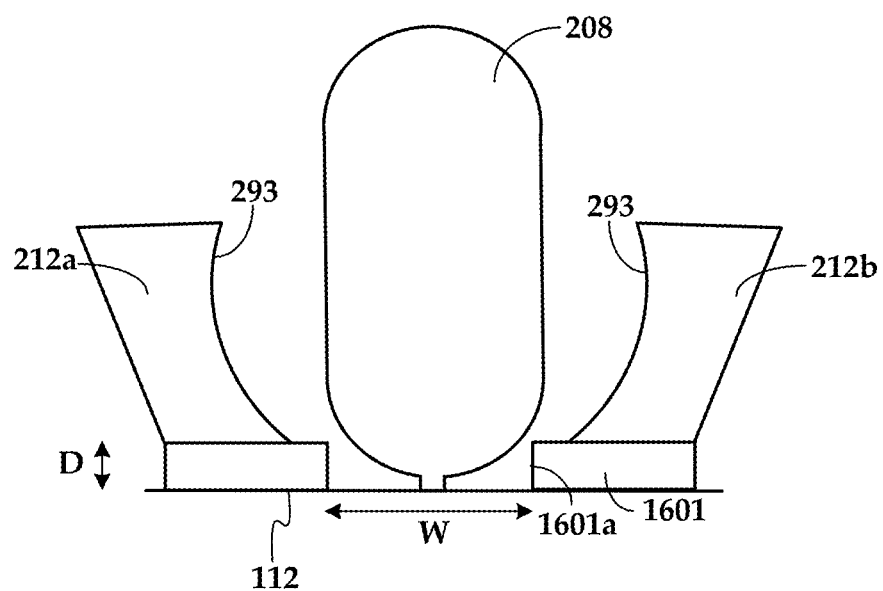
Figure 16C:
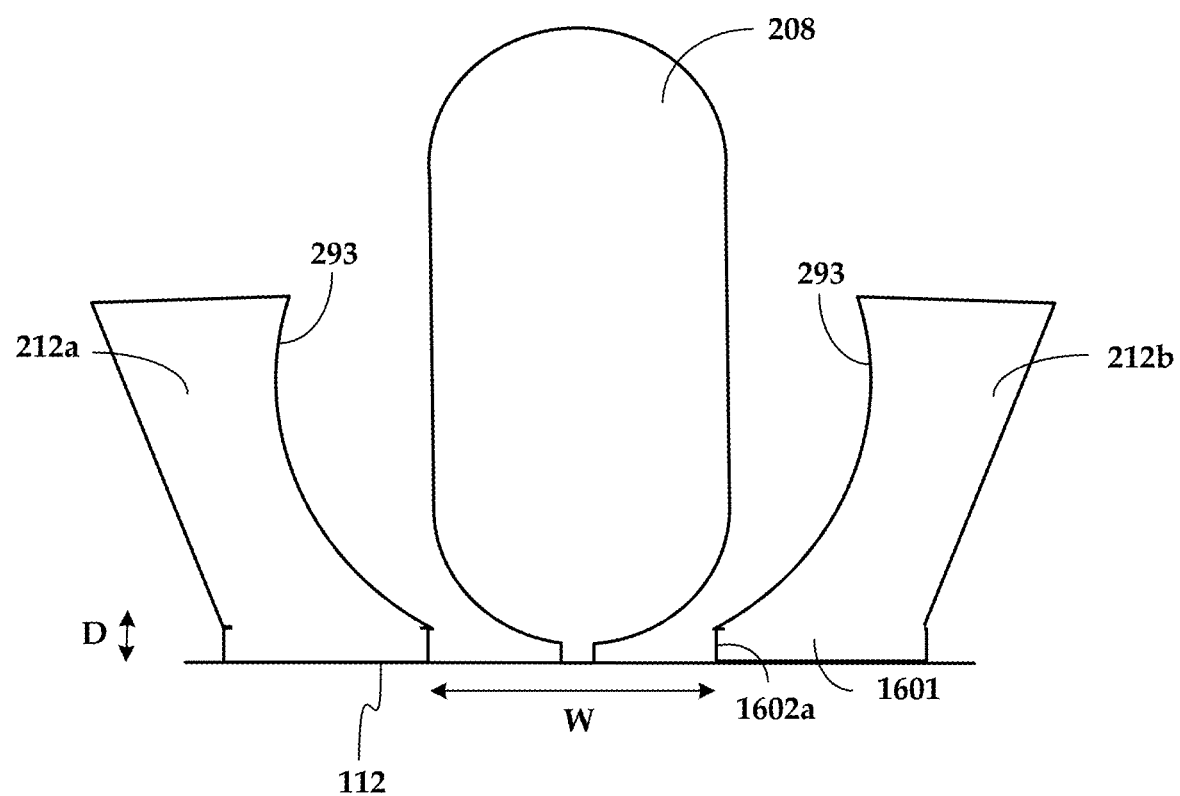

Further embodiments are illustrated in FIG. 16C. FIG. 16C includes first and second reflectors 212a, 212b having the same shape as those of FIG. 16B. However, there is no lateral displacement of the first region 1601 with respect to the reflectors. In other terms, the straight edge 1602a directly extends from, and is continuous with, side 293. As mentioned above, the first and/or second regions may be made of the same material as the reflectors, which is shown in FIG. 16C. When the first regions are comprised of the same materials, they may be considered part of the reflectors. Thus, the first region 1601 and reflector 212b can be patterned and formed at the same time during fabrication.

Figure 15A:
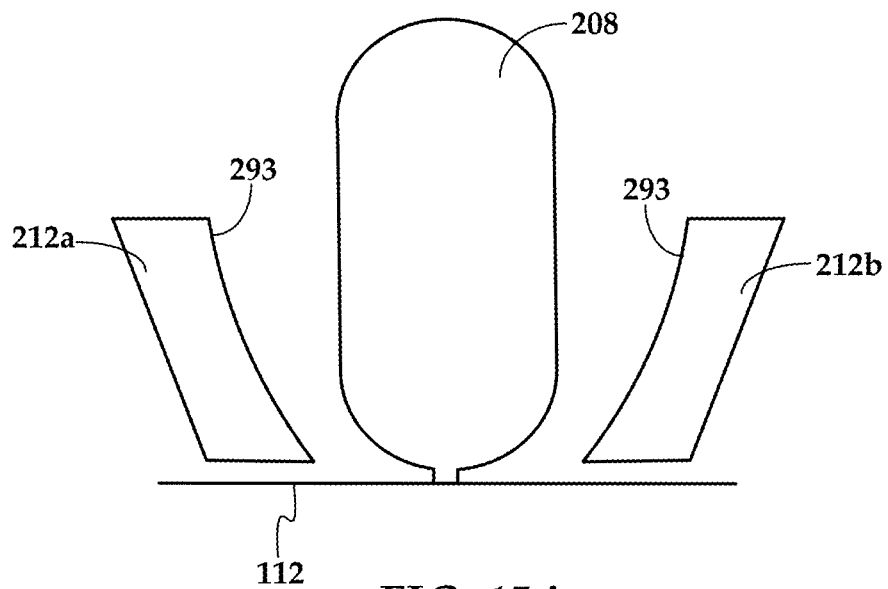
Figure 15B:
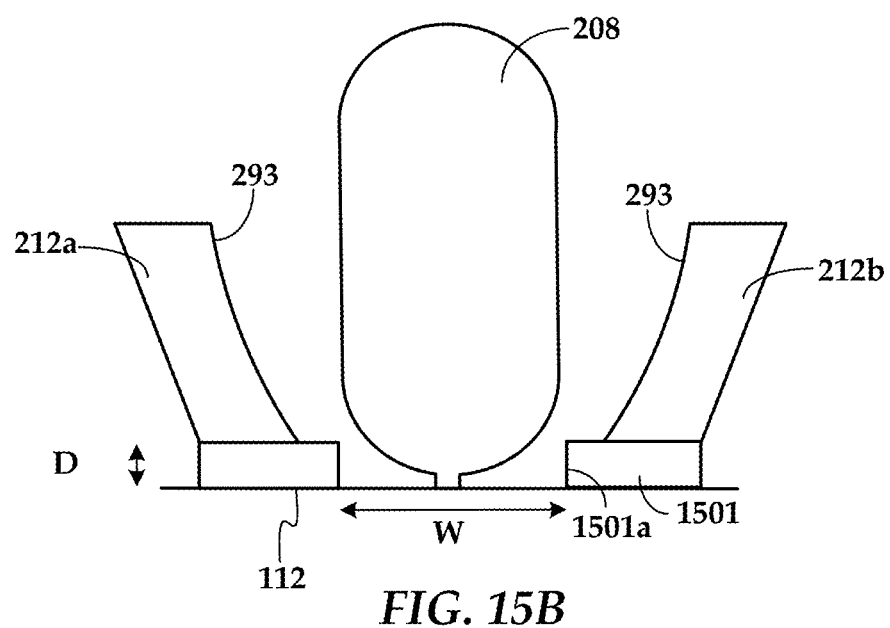

As illustrated in FIGS. 15B, 16B, and 16C, in some embodiments, the first regions 1501, 1601 have a straight edge 1501a, 1601a, 1602a proximate to the NFT 208. The straight edge 1501a, 1601a, 1602a controls the opening W between the first and second reflectors 212a, 212b for a range of different media facing surface 212 locations.

Without the straight edges 1501a, 1601a, the opening W at the media facing surface 212 can vary depending on where the media facing surface actually locates during the lapping process used in producing the recording head. For example, when the opening W occurs between two curved portions of the reflectors (as occurs using a one-step fabrication process), additional lapping removes more of the curved portions. This widens the opening W such that a small amount of over-lapping may create a significant variation in opening widths. In contrast, the straight edges 1501a, 1601a, 1602a create a consistent opening such that over-lapping does not alter, or minimally alters, the opening W. Without the straight edges 1501a, 1601a, 1602a performance variation can be introduced in mass-production implementations because the opening W controls how much background light is allowed to reach the recording media. When D is in a range of 10 nm to about 80 nm for the straight edges 1501a, 1601a, 1602a of the first region 1501, 1601, performance variation can be reduced. For example, W may be controlled to be between about 150 nm and about 500 nm in some embodiments.

Figure 17A:
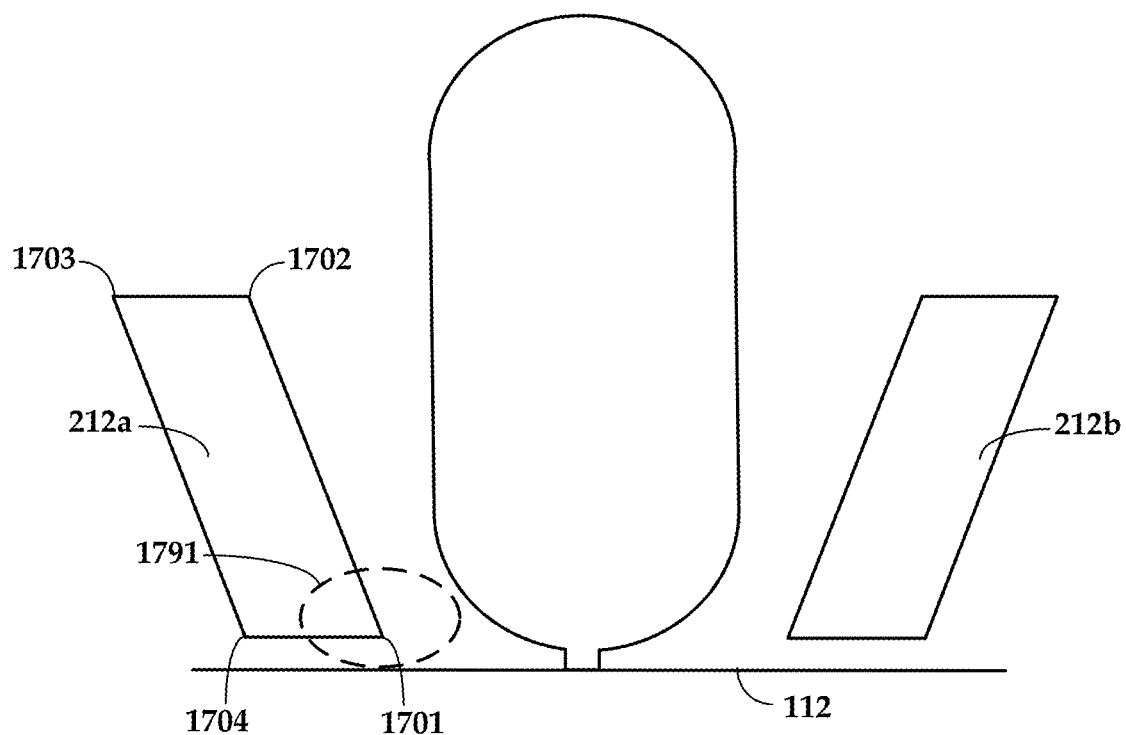
FIGS. 17A and 17B illustrate corner rounding of the first and second reflectors according to an example embodiment.
Figure 17B:
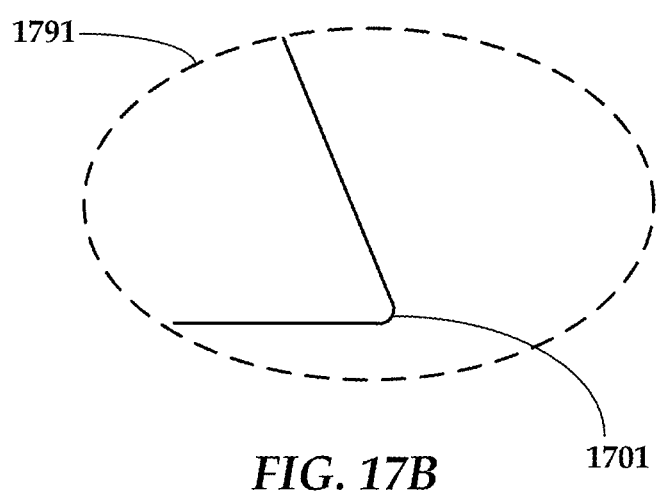

Referring now to FIGS. 17A and 17B, according to some implementations, when the first and second reflectors 212a, b of the focusing mirror are spaced apart from the media-facing surface, the corners of the first and second reflectors are not determined by lapping, but rather by photolithography and etching. FIG. 17A shows corners 1701 and 1702 of the first reflector 212a wherein one corner 1701 is enclosed by dashed oval 1791. FIG. 17B is a close-up view of the corner 1701. Excessive rounding of the corners of the first and/or second reflectors is not preferred because sharp corners reduce the interaction between the reflectors and the waveguide. According to some embodiments, one, some, or all of the corners 1701-1704 of the first and second reflectors 212a, 212b may have a radius of curvature, $R_r$, that is in a range of between about 20 nm to about 200 nm.

Figure 18:
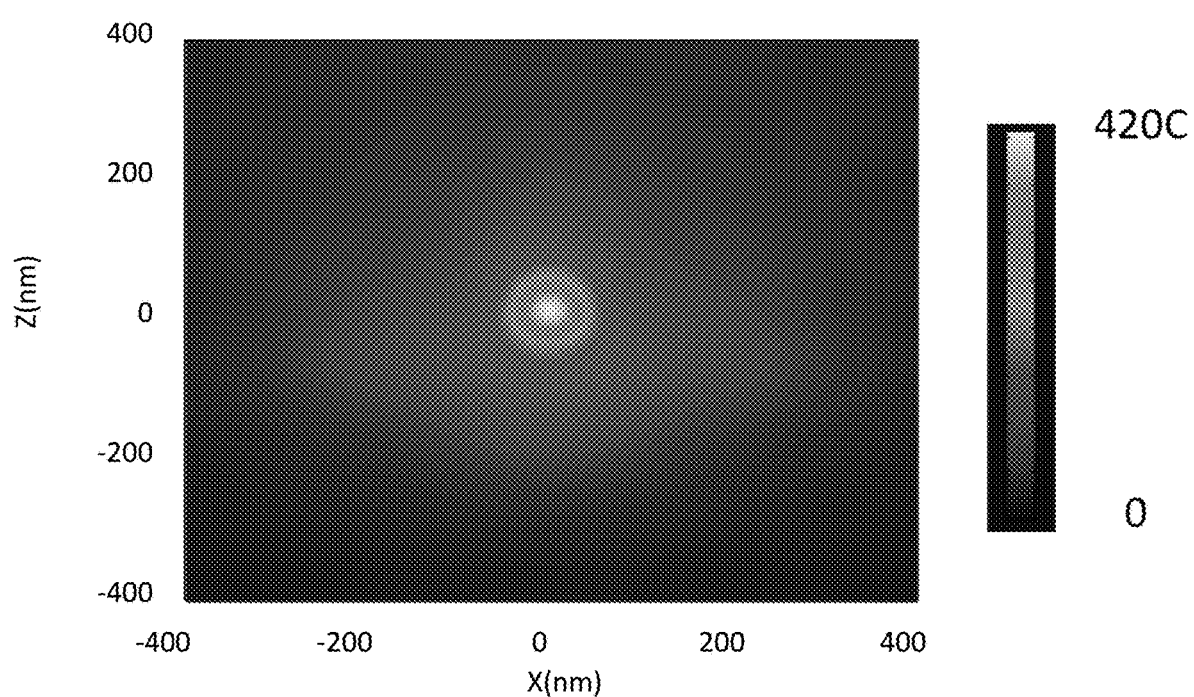
FIG. 18 is a temperature profile of a hotspot in a recording medium where a recessed focusing mirror in accordance with embodiments disclosed herein is present.
Figure 19A:
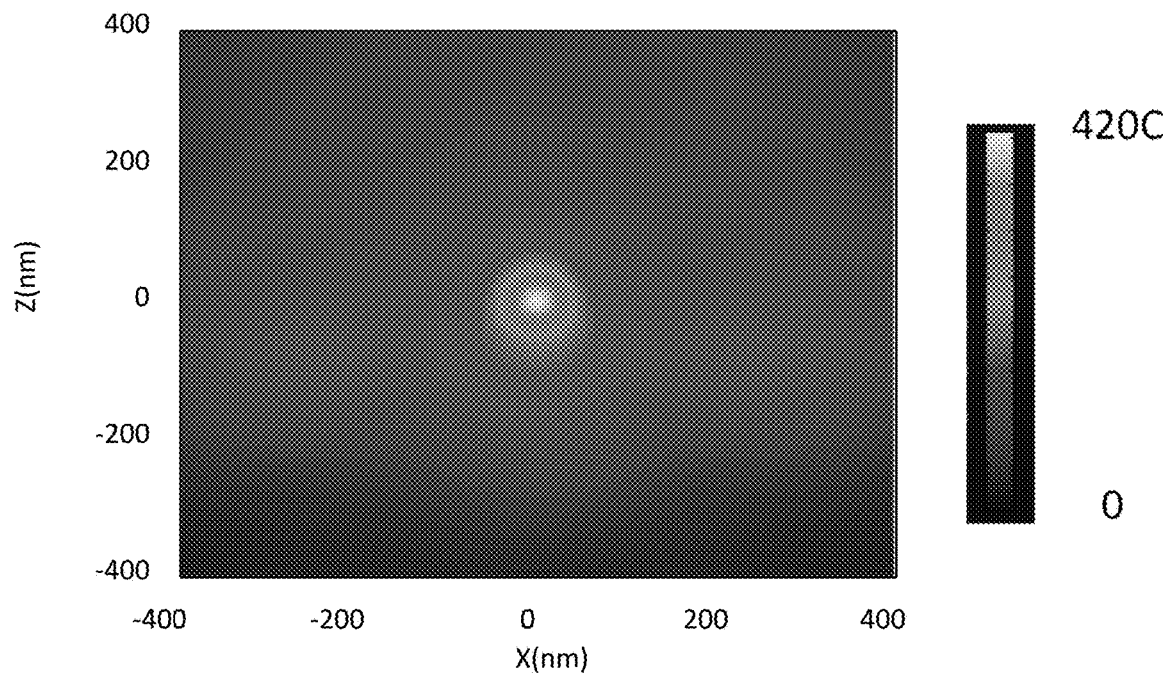
FIG. 19A is a comparative temperature profile of a hotspot in a recording medium without a focusing mirror.
Figure 19B:
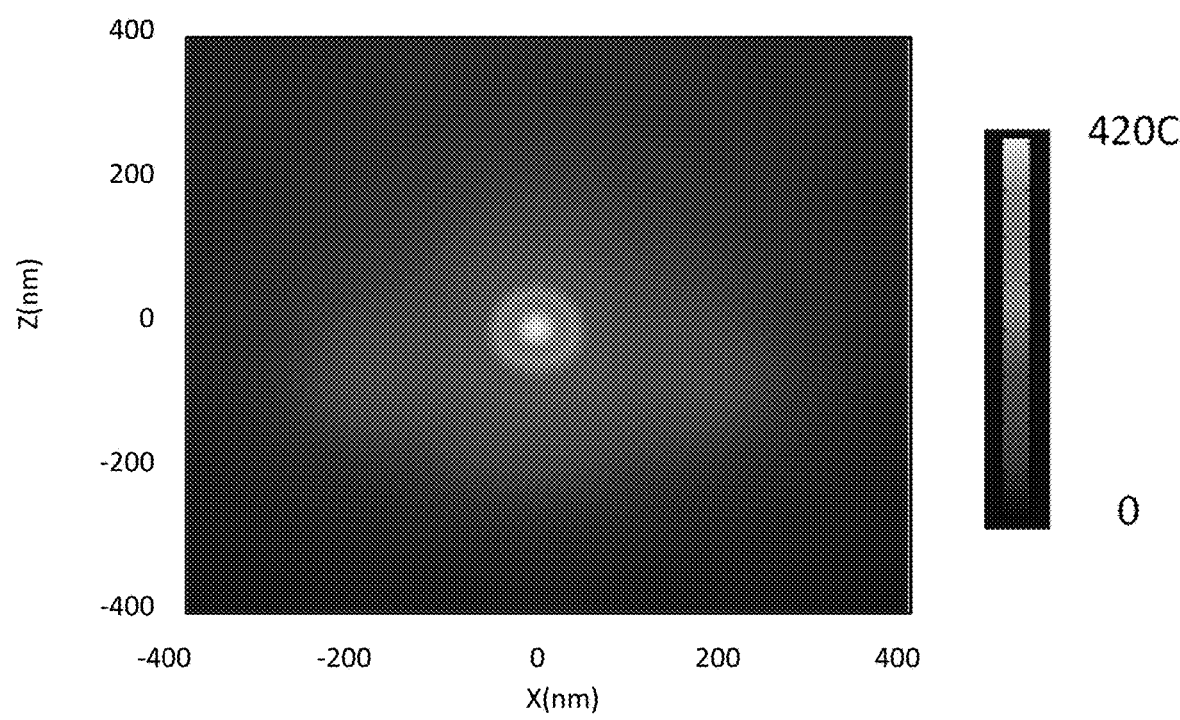
FIG. 19B is a comparative temperature profile of a hotspot in a recording medium where a focusing mirror that is not recessed from the media-facing surface of the slider is present.

FIG. 18 shows the temperature rise at the middle plane of an FePt recording layer of a recording medium after the illumination of 10 mW in power and 10 ns in time with a recessed focusing mirror that is spaced apart from the media-facing surface of the recording head as described herein. For comparison, FIG. 19A shows the temperature rise at the middle plane of an FePt recording layer after the illumination of 10 mW in power and 10 ns in time without a focusing mirror present in the recording head. FIG. 19B shows the temperature rise at the middle plane of an FePt recording layer after the illumination of 10 mW in power and 10 ns in time with a focusing mirror without the recess from the media-facing surface. In FIGS. 18, 19A, and 19B, the peak temperatures are all normalized to the same value to reflect actual recording conditions.

The peak temperature rise increases from about 589 K to about 600 K with a subwavelength-sized parabolic mirror that is spaced apart 20 nm from the media-facing surface. This is an increase of 8% when compared to the comparative scenario without the focusing mirror (i.e., FIG. 19A). The normalized temperature rise is accompanied with significant thermal background reduction, leading to a 1.9 K/nm increase in thermal gradient (TG).

Both examples that utilize a focusing mirror (FIGS. 18 and 19B) show a cleaner thermal background compared to the example without a focusing mirror (FIG. 19A). As will be appreciated from FIGS. 18, 19A, and 19B, a device without a focusing mirror (FIG. 19A) has a wider thermal background when compared to a device with a focusing mirror (FIGS. 18 and 19B) which has a more confined thermal background.

Additional information about an NFT used in combination with a focusing mirror is described in commonly-owned U.S. Pat. No. 9,852,753 which is incorporated herein by reference.

Figure 20:
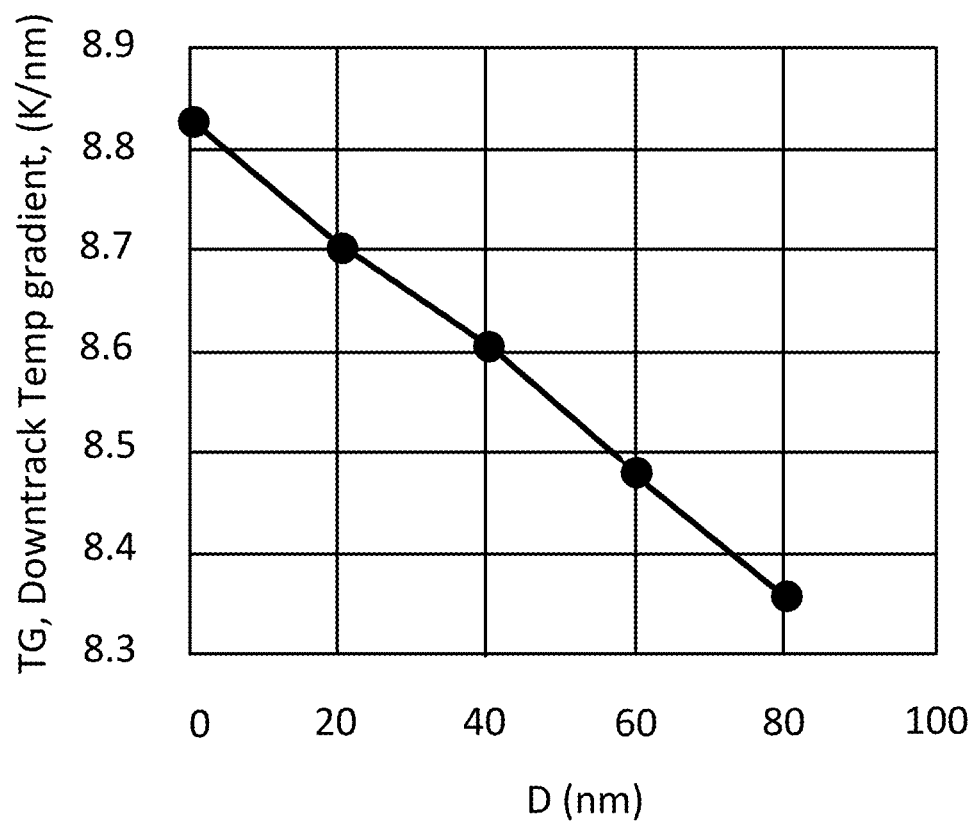
FIG. 20 is a graph of the thermal gradient present in a recording medium as a function of the distance the focusing mirror is spaced apart from the media-facing surface in accordance with certain embodiments.

FIG. 20 is a graph of the thermal gradient, TG, as a function of D, which is the distance between the reflectors of the focusing mirror and the media-facing surface, as previously discussed. The thermal gradient dropped by less than 0.2 K/nm when D was less than 40 nm. The thermal gradient dropped by less than 0.25 K/nm when D was less than 50 nm, and the thermal gradient dropped by less than 0.35 K/nm when D was less than 60 nm.

Figure 21:
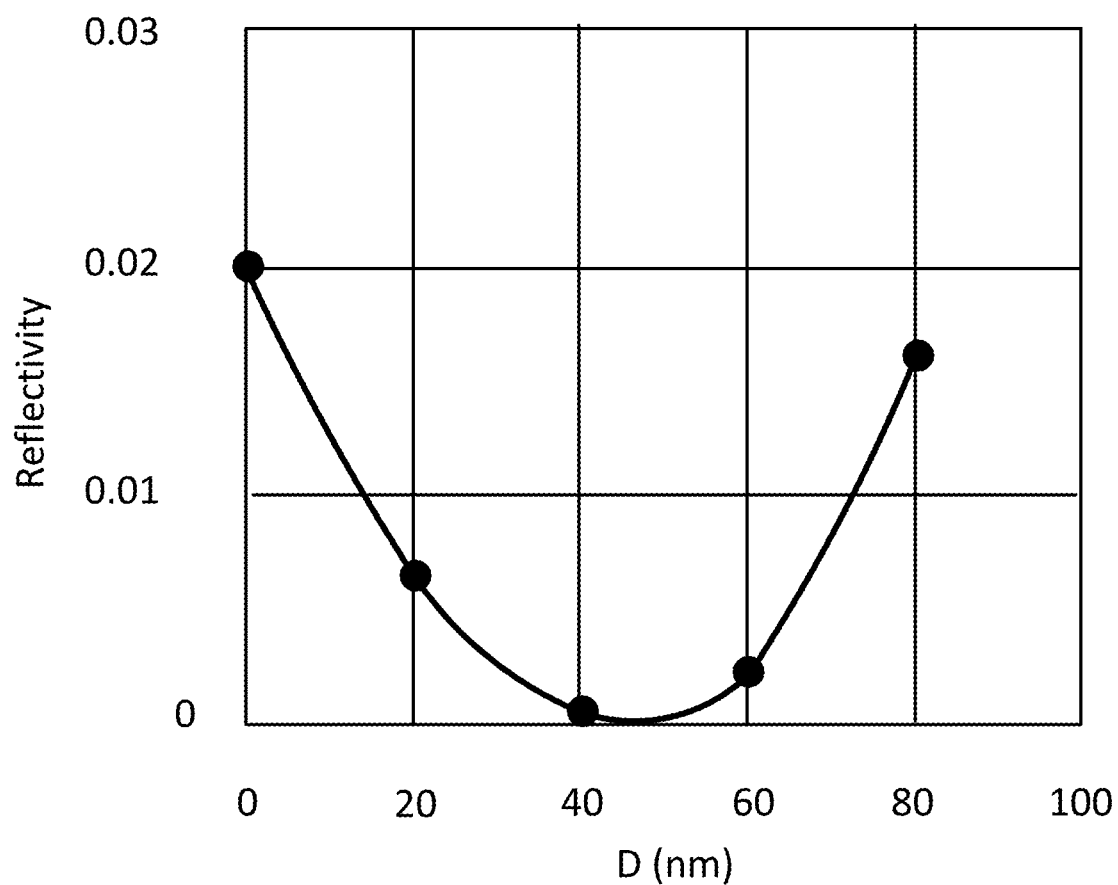
FIG. 21 is a graph of the back reflection for a recording head as a function of the distance the focusing mirror is spaced apart from the media-facing surface in accordance with certain embodiments.

Back reflection measures the percentage of power reflected from the NFT toward the laser source. Small enough back reflection would maintain laser stability during writing, by reducing the possibility of reflected power shifting or interfering with the laser operation condition. FIG. 21 is a graph of the back reflection as a function of D, which is the distance between the reflectors of the focusing mirror and the media-facing surface, as previously discussed. As shown in the graph of FIG. 21, the back reflection is substantially contained when the focusing mirror is spaced apart from the media-facing surface by a distance between about 10 nm and about 60 nm.

Further improvements may be realized as a function of how the focusing mirror is formed. As discussed below in connection with FIGS. 43-46, a two-step process of forming a recording head that includes first regions 1602a as shown in FIG. 16C may be used as compared with a single step process of forming first regions. The following table compares modeling parameters for a side-coupling structure when fabricated with a one-step vs. a two-step process.

TABLE 1

| | ABS Opening (nm) | DTTG (K/nm) | Peg T (K) | Power Required (A.U.) | ABS Reflection (%) |
|---|---|---|---|---|---|
| 1-step | 280 | 7.1 | 266 | 4.68 | 0.3 |
| 2-step | 200 | 7.5 | 300 | 5.15 | 0.4 |

As may be seen, the two-step process allows for fabrication of an ABS opening that is smaller than can be formed using a one-step process. This can provide an improved thermal gradient (e.g., down-track thermal gradient) in the recording medium. Further details on fabrication processes are set forth below.

Figure 22:
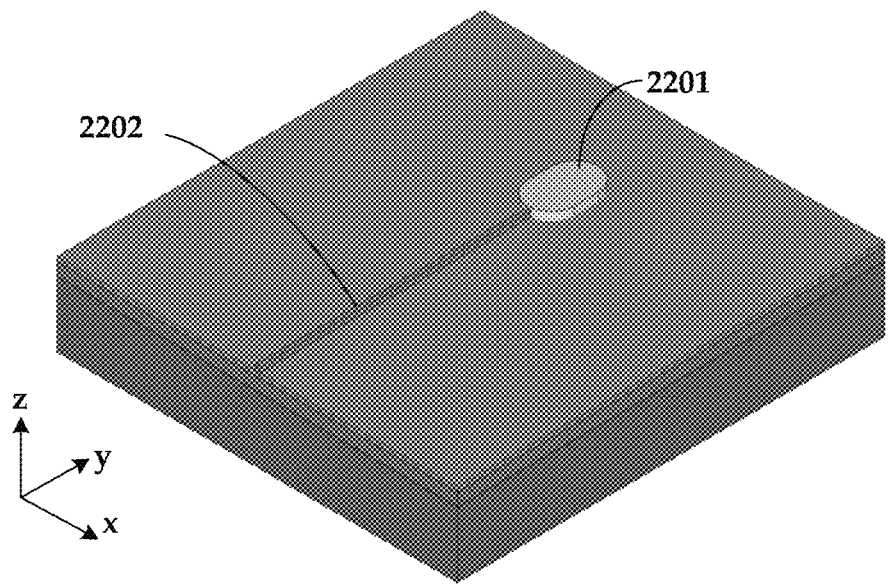
FIGS. 22-30 illustrate a process of forming a recording head in accordance with certain embodiments.
Figure 23:
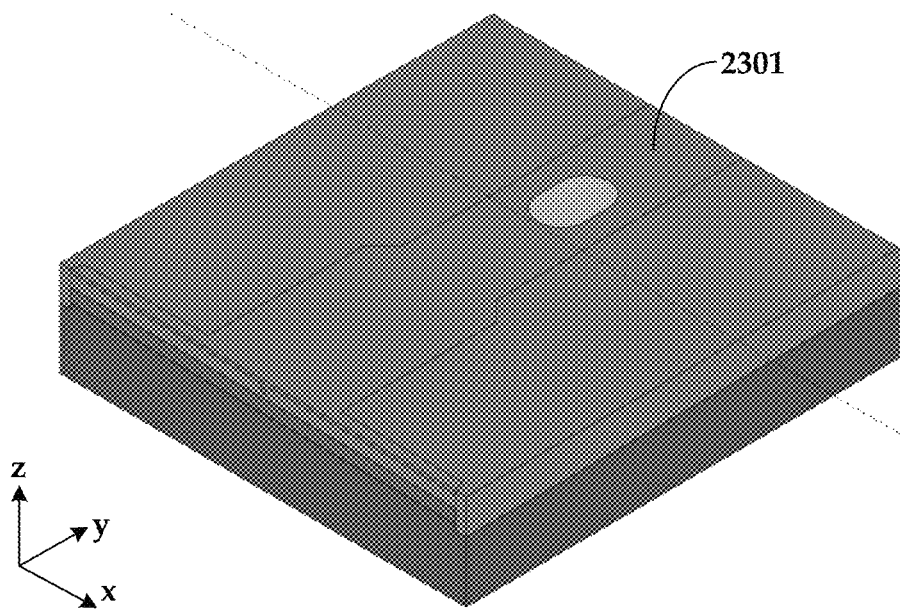
Figure 24:
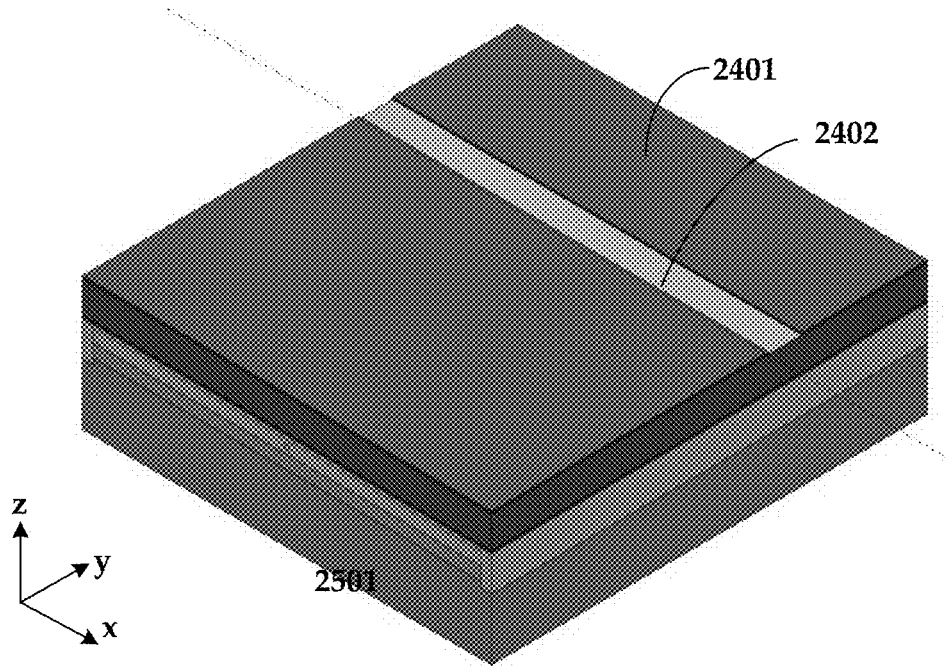

FIGS. 22-30 provide a step-by-step illustration of the process of forming a portion of a recording head that includes a focusing mirror as described herein. FIG. 22 provides a perspective view of a subassembly comprising a portion of the recording head after the NFT disc 2201 and peg 2202 are patterned. FIG. 23 illustrates the process of patterning the waveguide of the recording head. First the waveguide 2301 is patterned. Subsequently an AlO side cladding is deposited followed by polishing using chemical mechanical polishing (CMP). FIG. 24 illustrates the process of patterning a first hard mask 2401 used for forming the focusing mirror. In this example, the hard mask layers that are deposited comprise (from bottom to top): 20 nm amorphous carbon (aC)/5 nm Cr/about 200 nm to 280 nm aC/about 7 nm to about 8 nm TaN/10 nm aC/10 nm SiO$_2$. The hard mask is then patterned and the top two layers (10 nm aC/10 nm SiO$_2$) are etched away in a rectangular shaped area 2402. The width of the rectangular area 2402 in the Y direction is the same as final height, H$_{pm}$, of the focusing mirror (see, FIG. 10).

Figure 25:
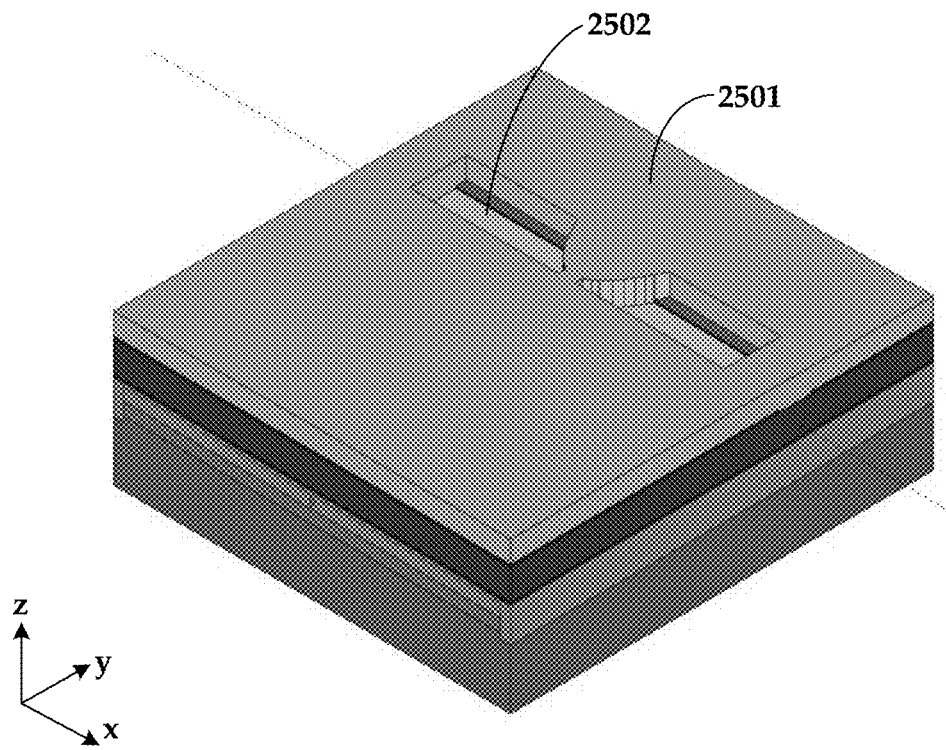
Figure 26:
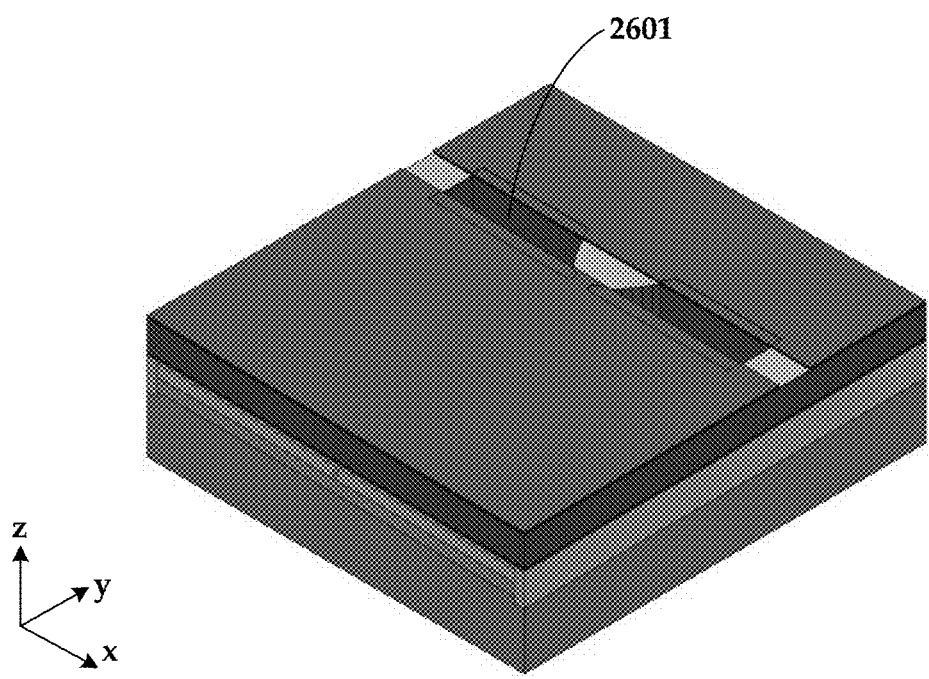
Figure 27:
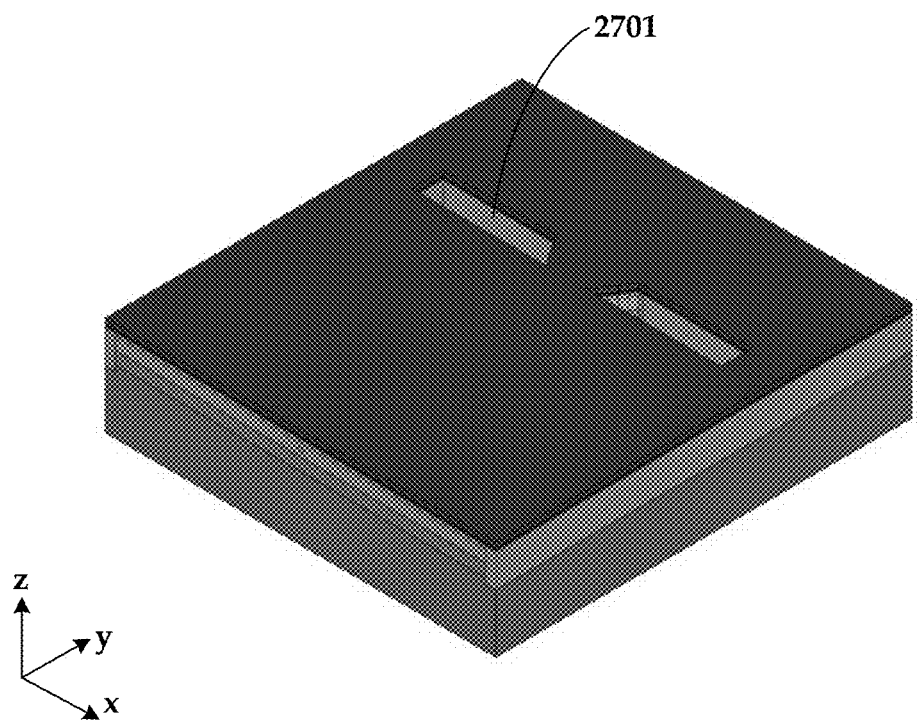

FIG. 25 illustrates the step of patterning a second hard mask 2501 involving a second lithography step to define the width and side shape of the reflectors. The width of the opening 2502 in the Y direction is a little bit wider than the height, H$_{pm}$, of the focusing mirror (see, FIG. 10). FIG. 26 illustrates the portion of the recording head subassembly after etching, e.g., by inductively coupled plasma (ICP) etching, through the rest of the hard mask layers including from top to bottom the TaN/aC/Cr/aC layers. The final shape of the rectangular openings 2601 of the hard mask is the same as the desired shape of the reflectors. FIG. 27 illustrates the process of etching the trench 2701 for the reflectors. The reflector trench 2701 is etched, for example, by ICP, to a desired depth.

Figure 28:
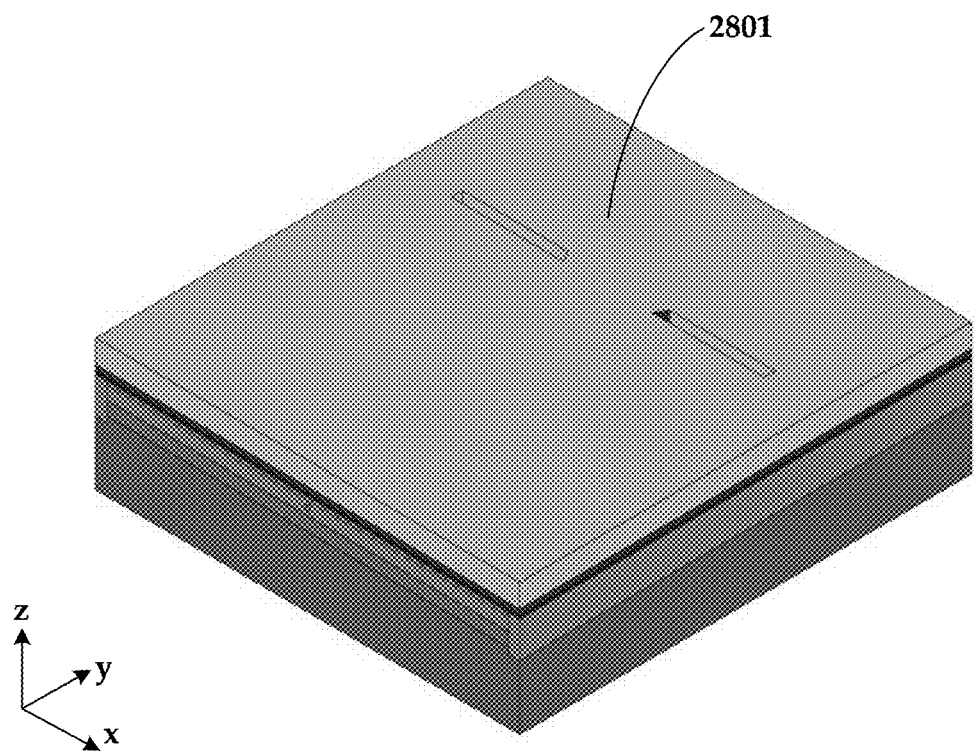
Figure 29:
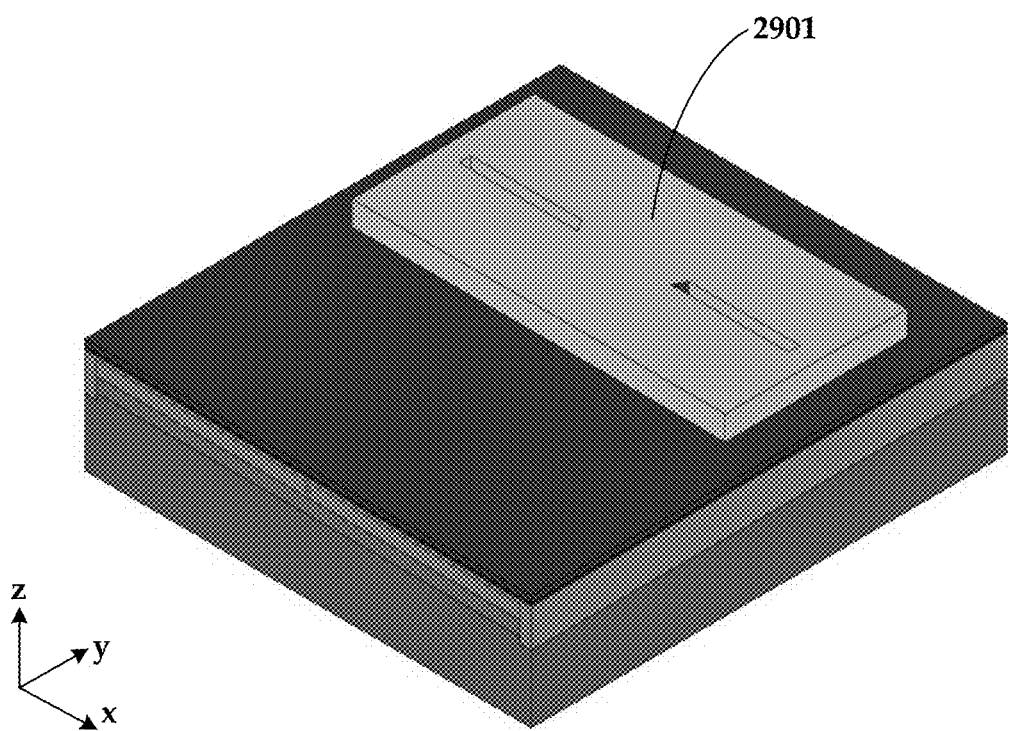
Figure 30:
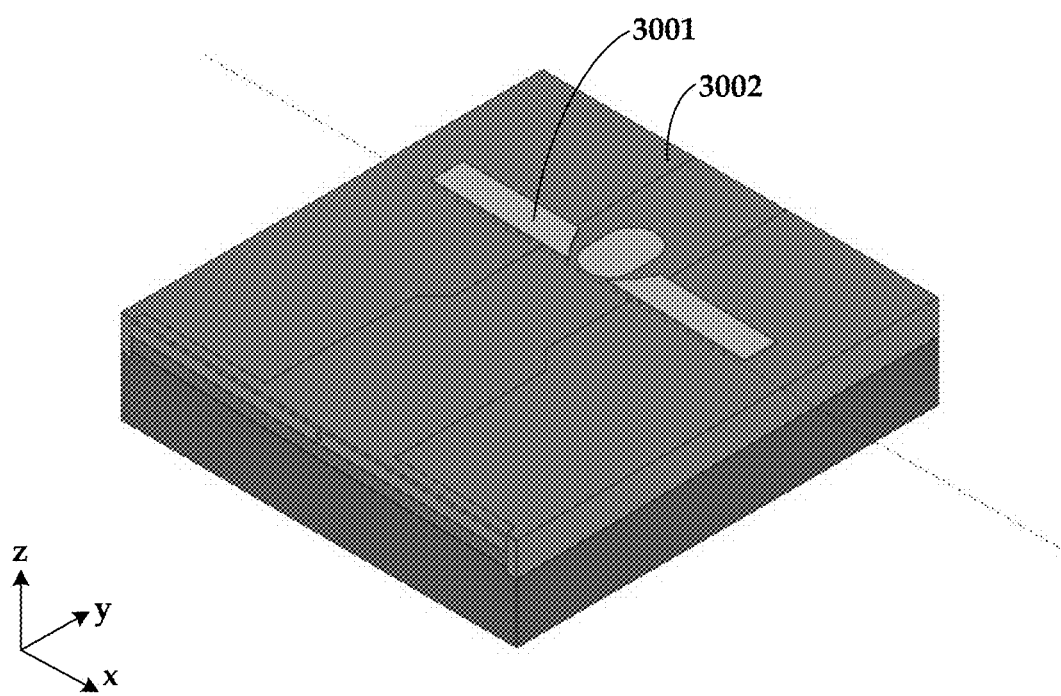

FIG. 28 illustrates the portion of the recording head after the reflectors are plated. The plating process involves depositing a Au seed layer followed by plating a Au layer 2801 over the surface and into the reflector trenches (see, 2701 of FIG. 27) to fill the trenches. In a subsequent step, the reflector areas are photolithographically covered and extra plated Au is then milled away from the field as illustrated in FIG. 29 leaving a portion of the Au layer 2901 in the reflector trench area. This step reduces the polish areas in the next step. FIG. 30 depicts the recording head following removal of several layers. The Au layer is polished by CMP to the top of the aC hard mask layer. The top aC layer is then removed to expose the Cr layer. A second CMP step polishes the Au layer flat with the Cr hard mask layer. This polishing step controls the thickness of the reflectors 3001 (in the z direction) above the top surface 3002 to about 20 nm (which is substantially the same as the second aC layer thickness). The Cr layer of the hard mask is then etched away followed by an ash away of the second aC layer.

Figure 31:
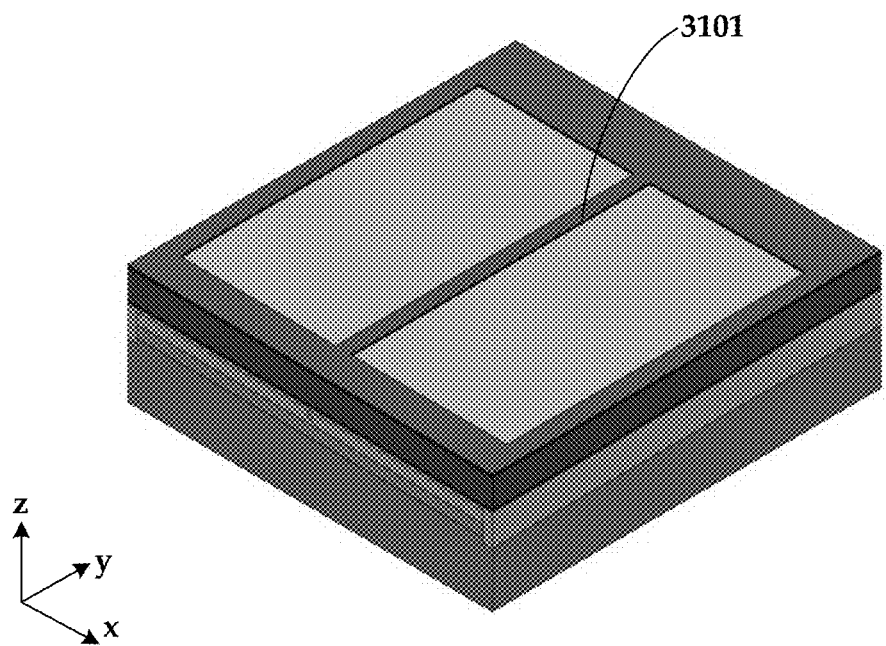
FIGS. 31-42 illustrate a process of forming a recording head that includes first regions as shown in FIG. 14B.
Figure 32:
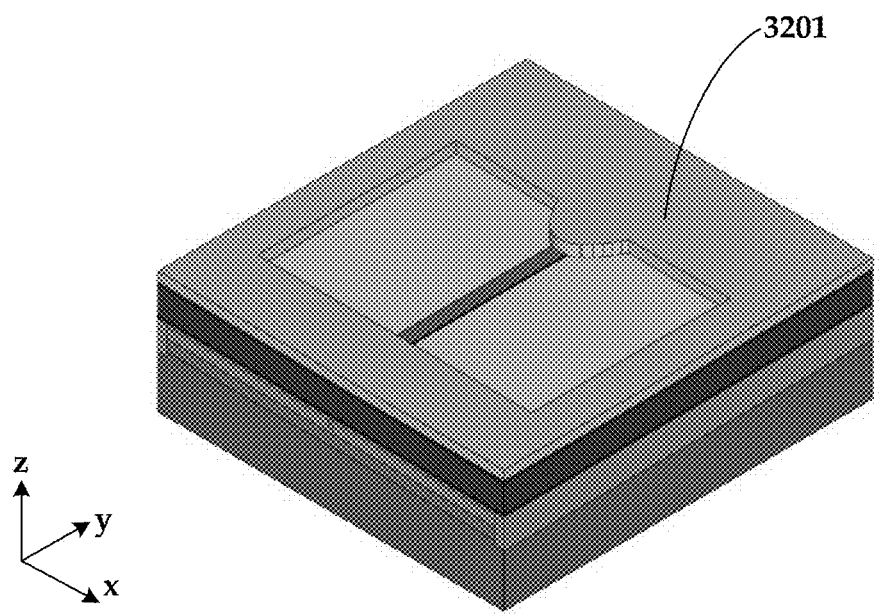
Figure 33:
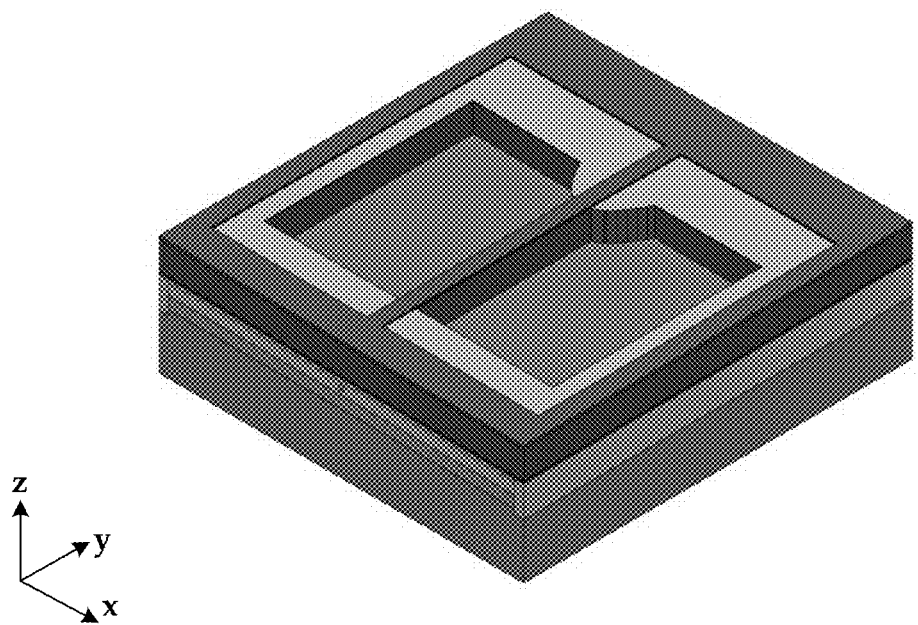

FIGS. 31-40 illustrate the process of forming a recording head that includes first regions 1401 as shown in FIG. 14B. FIG. 31 shows a portion of a recording head subassembly after the first hard mask has been deposited and patterned as previously described in the example of FIGS. 22-30. As before, the hard mask layers that are deposited (from bottom to top) include: 20 nm amorphous carbon (aC)/5 nm Cr/about 200 nm to 280 nm aC/about 7 nm to about 8 nm TaN/10 nm aC/10 nm $SiO_2$. The first SiO2/aC hard mask layers are etched stopping on the TaN layer. The width of the middle line 3101 defines the final opening, W, between the reflectors (see, FIG. 15B). The reflector opening, W, will be constant independent of the lapping distance. FIG. 32 illustrates the subassembly after patterning the second hard mask. The second hard mask 3201 is photolithographically patterned to define the parabolic shape of the reflectors and edges. FIG. 33 illustrates the portion of the recording head subassembly after etching the hard mask layers to define the reflector shape.

Figure 34:
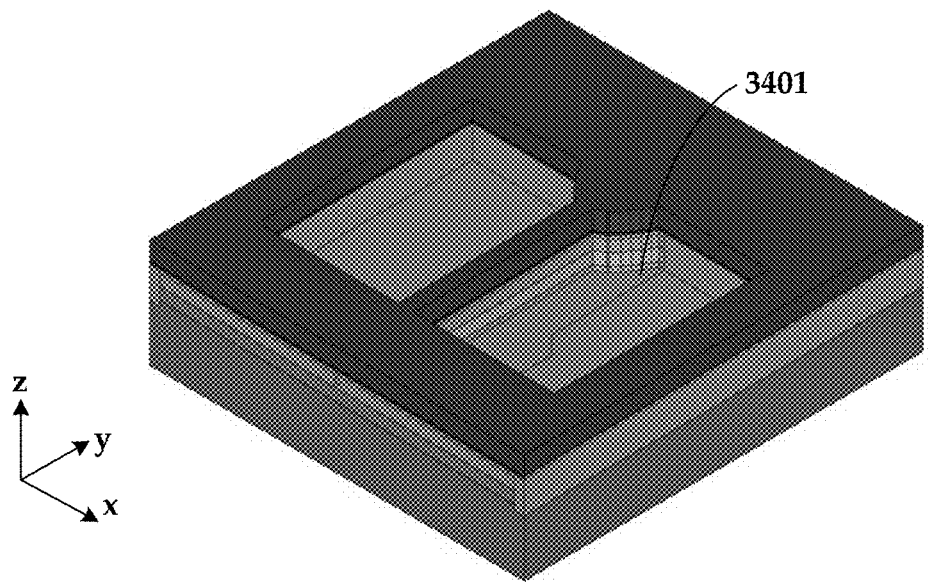
Figure 35:
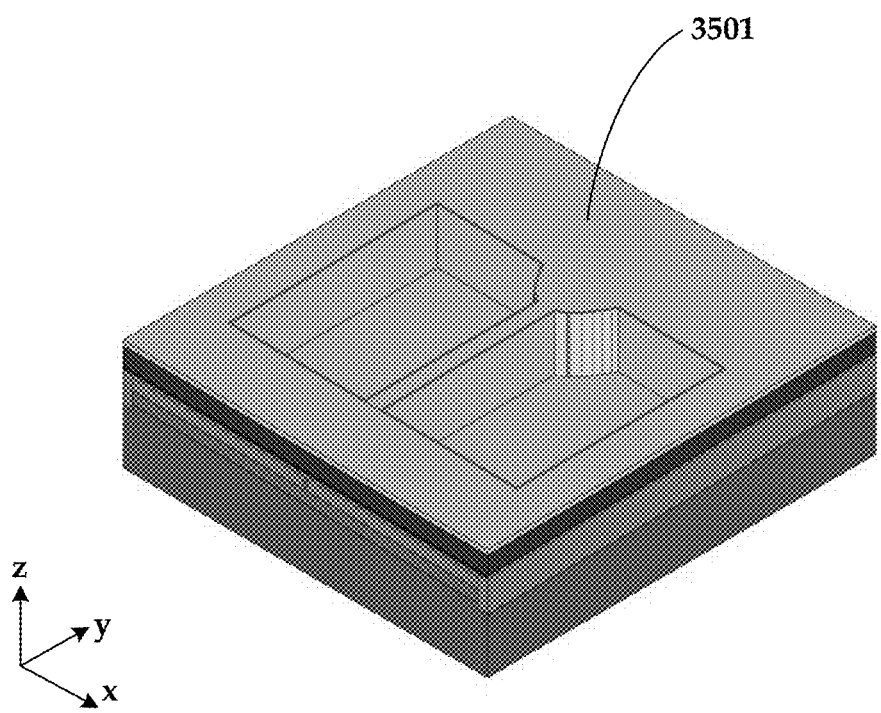
Figure 36:
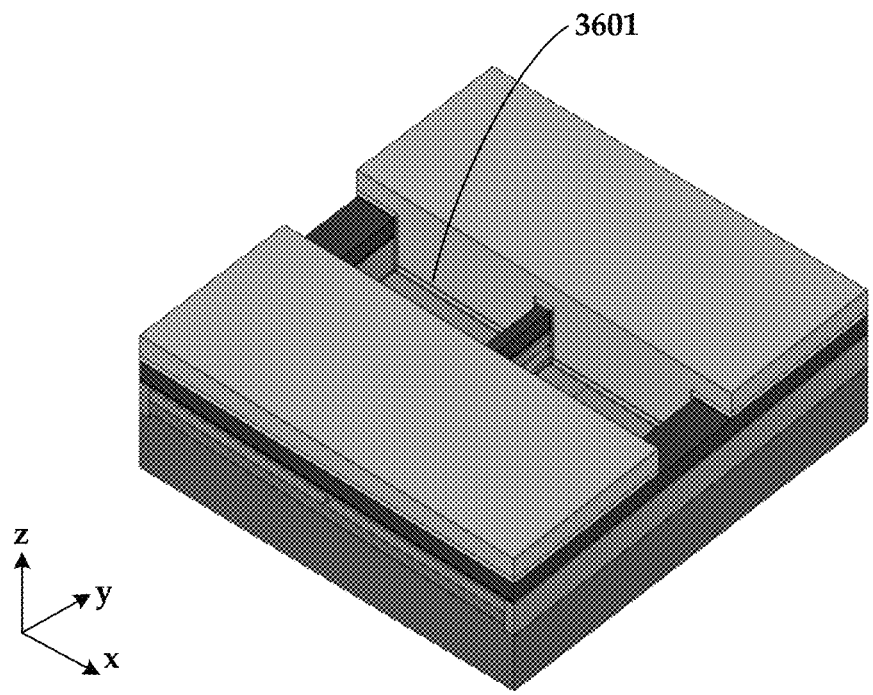
Figure 37:
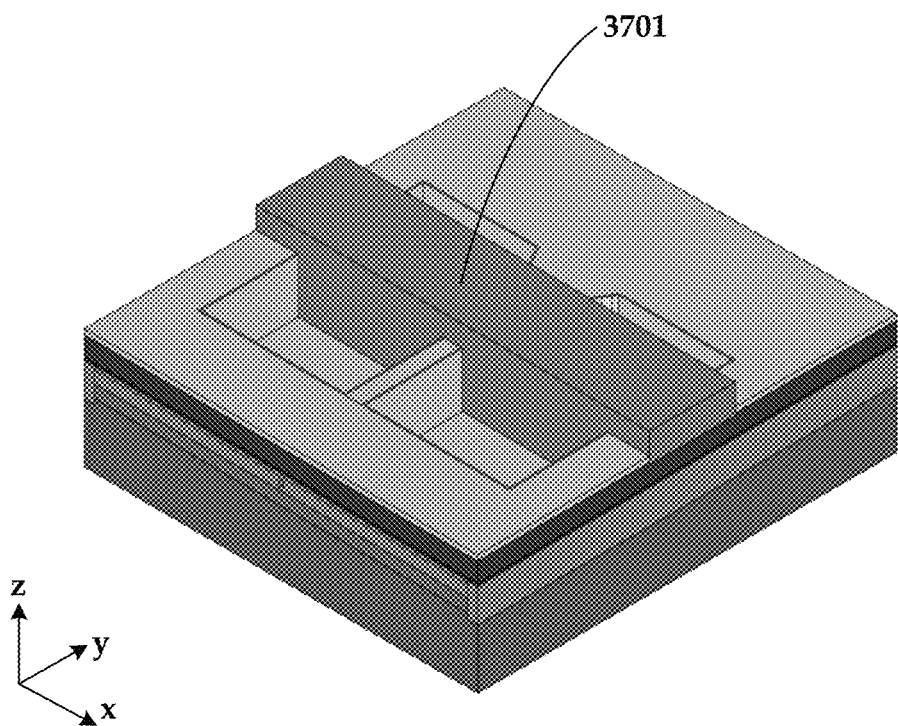

FIG. 34 shows the subassembly after the reflector trenches 3401 are etched, e.g., by ICP. A Au seed layer 3501 is then deposited and followed by deposition of a Au layer, as shown in FIG. 35. The first regions (as described above in connection with FIG. 14B), including the first region edges, are photolithographically patterned. The Au and Au seed layers are milled to create a step 3601, as shown in FIG. 36, along the opening direction of the focusing mirror. A seed material and the material of the first region 3701 is deposited in the step shown in FIG. 37. A high angle (~60 degree) mill removes the plated first region material from the top of the photoresist only. The photoresist is then stripped.

Figure 38:
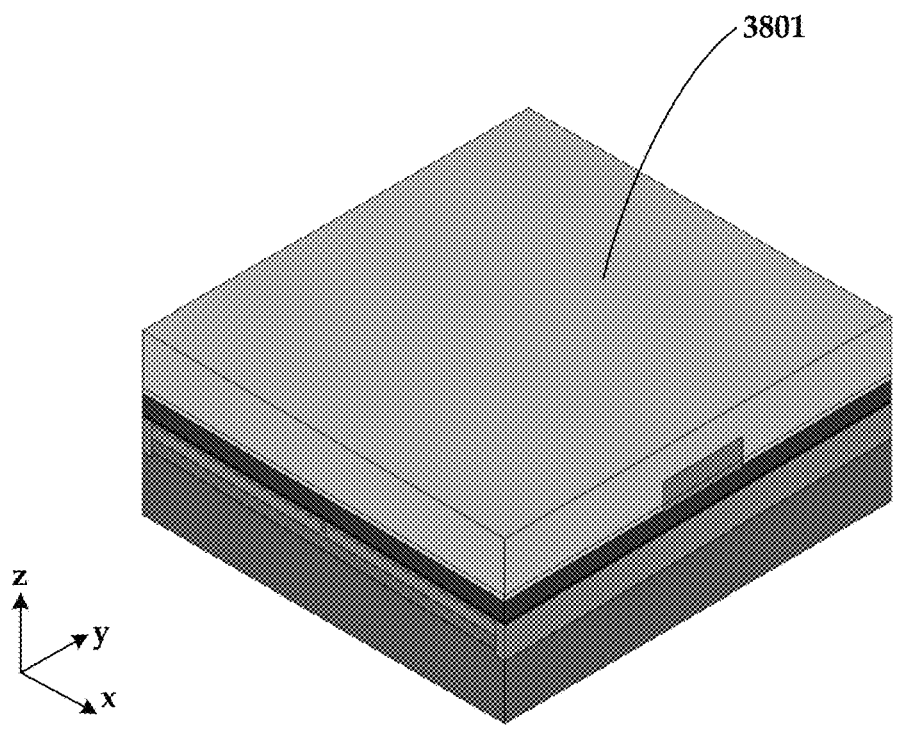
Figure 39:
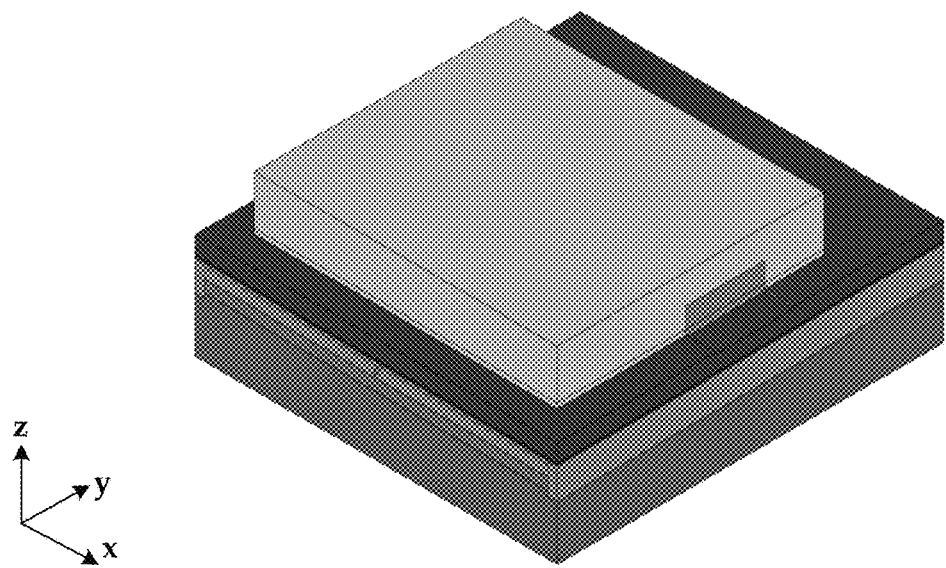
Figure 40:
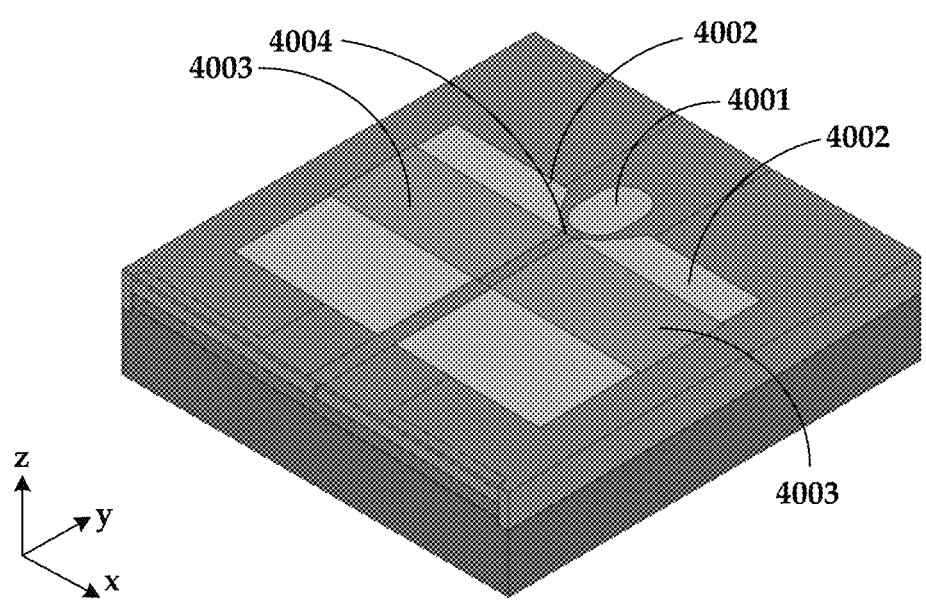
Figure 41:
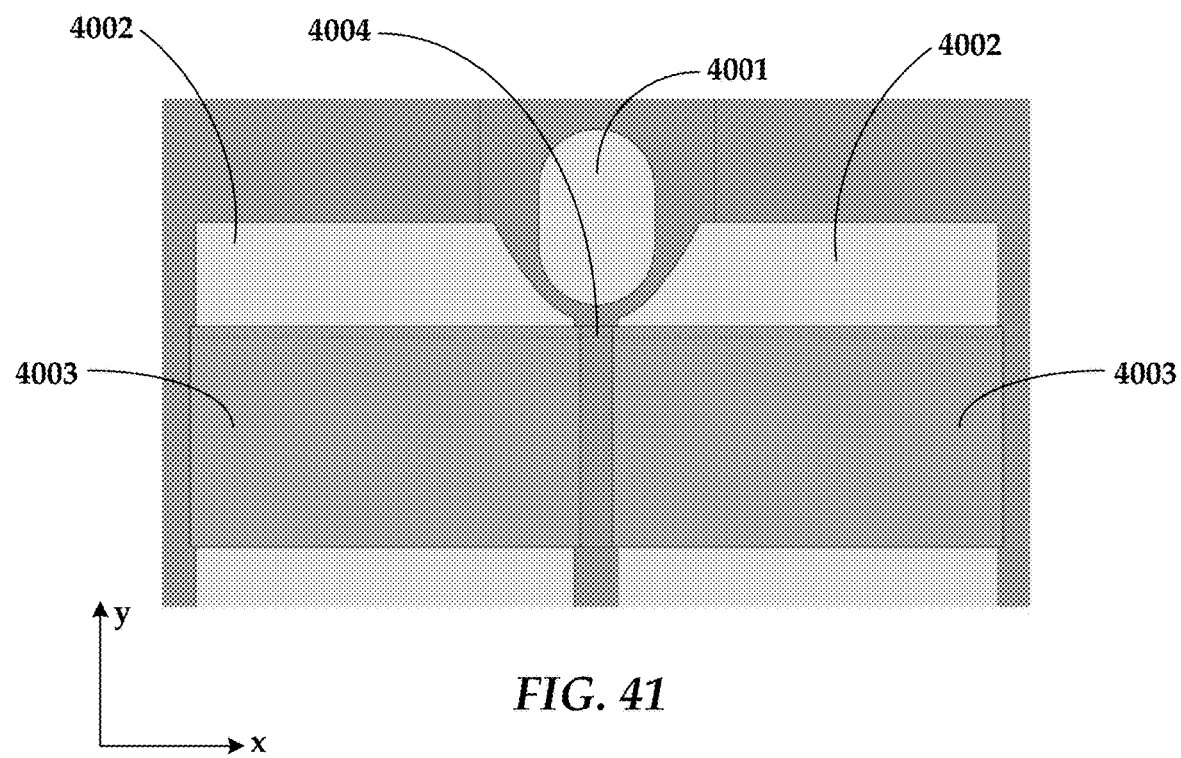
Figure 42:
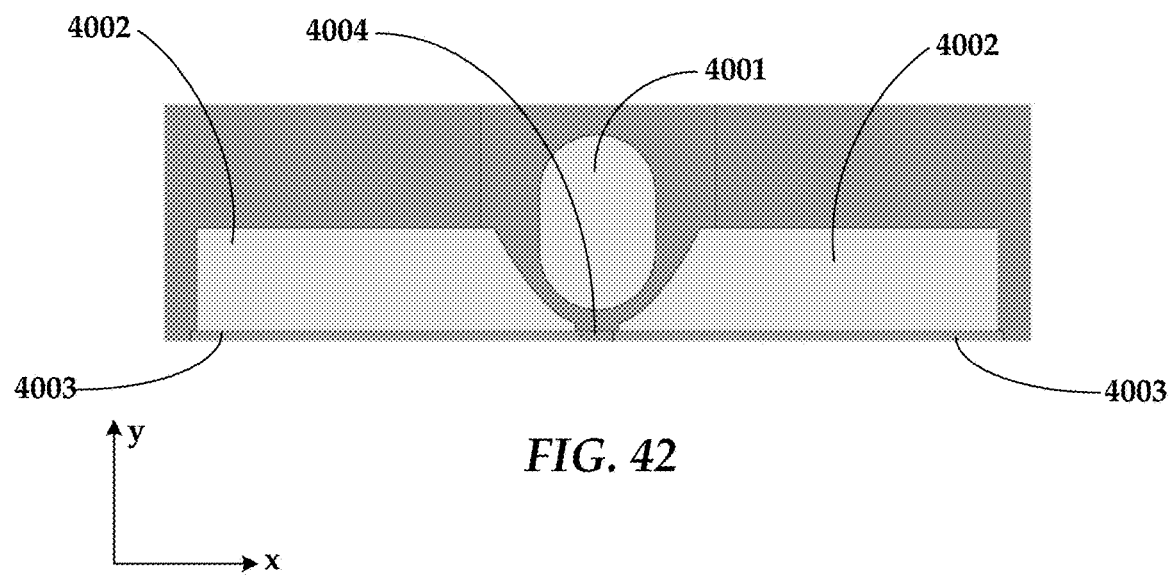

FIG. 38 shows the portion of the recording head subassembly after a Au layer 3801 is plated to fill the reflectors. The Au layer 3801 is field milled away from some portions of the field as illustrated in FIG. 39. FIG. 40 is a perspective view and FIG. 41 is a top down view of the subassembly after it has been polished, e.g., by CMP, to remove the hard mask layers and before lapping. FIGS. 40 and 41 show the disc 4001 of the NFT, the reflectors 4002, the opening between the reflectors 4004 and the first region material 4003 before lapping. FIG. 42 shows a top down view of the subassembly after lapping the first region material 4003.

Figure 43:
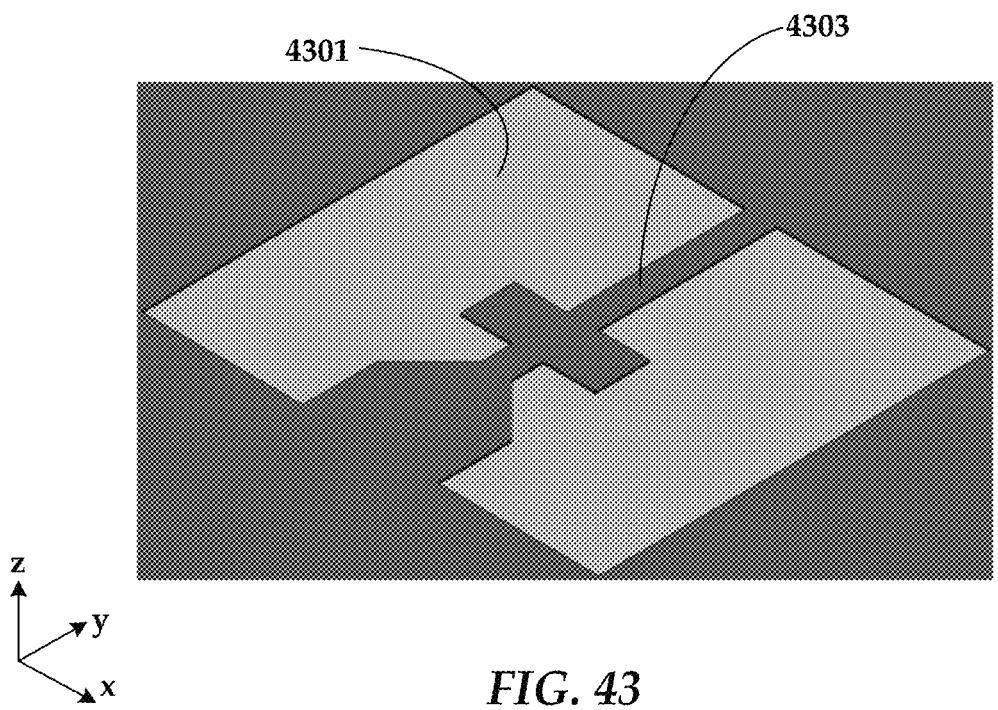
FIGS. 43-46 illustrate a two-step process of forming a recording head that includes first regions as shown in FIG. 16C.
Figure 44:
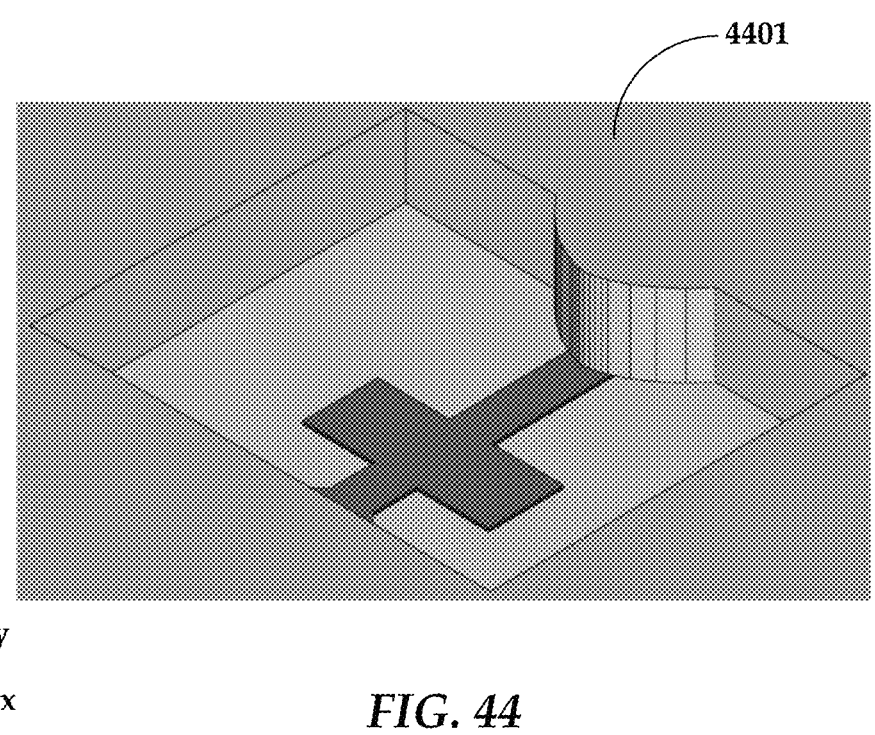
Figure 45:
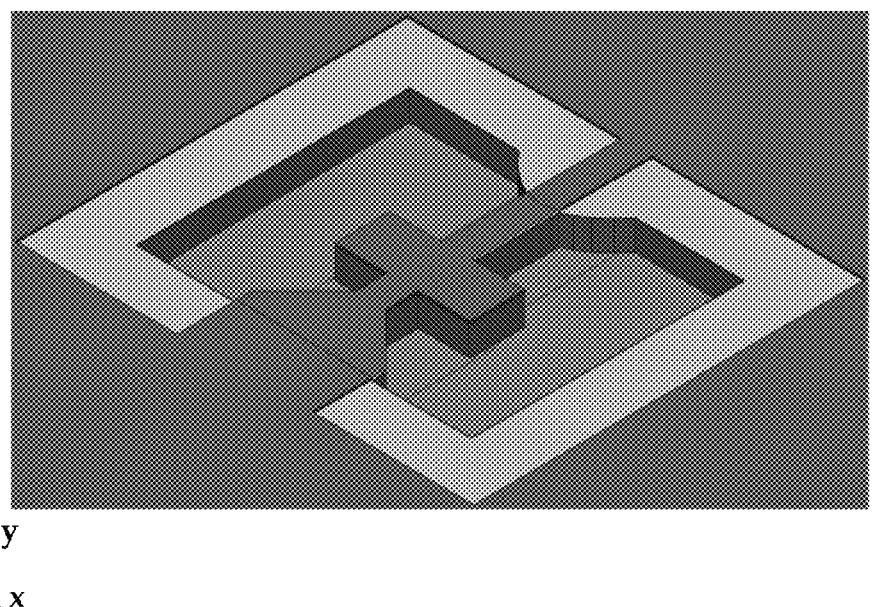

FIGS. 43-46 illustrate a two-step process of forming a recording head that includes first regions 1602a as shown in FIG. 16C. FIG. 43 shows a portion of a recording head subassembly after the first hard mask 4301 has been deposited and patterned as previously described in the example of FIGS. 22-30. As before, the hard mask layers that are deposited (from bottom to top) include: 20 nm amorphous carbon (aC)/5 nm Cr/about 200 nm to 280 nm aC/about 7 nm to about 8 nm TaN/10 nm aC/10 nm $SiO_2$. The first SiO2/aC hard mask layers are etched stopping on the TaN layer. The width of the middle line 4303 defines the final opening, W, between the reflectors (see, FIG. 16C). The reflector opening, W, will be constant independent of the lapping distance. FIG. 44 illustrates the subassembly after patterning the second hard mask. The second hard mask 4401 is photolithographically patterned to define the parabolic shape of the reflectors and edges. FIG. 45 illustrates the portion of the recording head subassembly after etching (e.g., ICP etching) the hard mask layers to define the reflector shapes.

Figure 46:
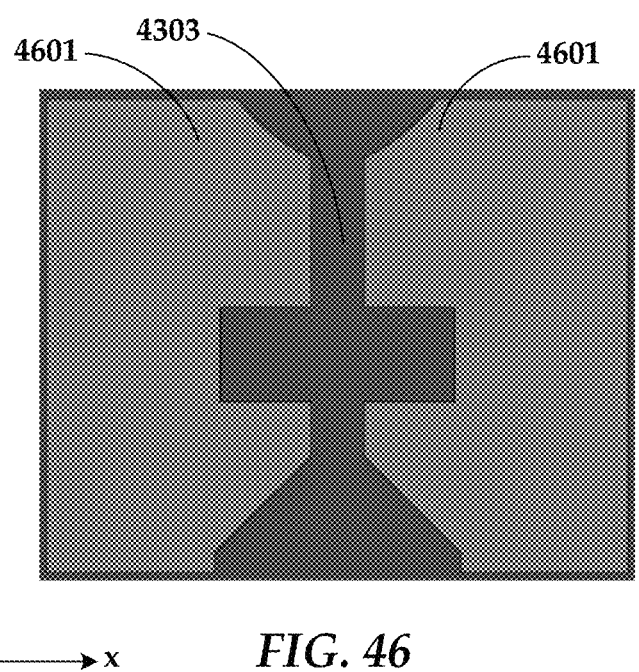

FIG. 46 shows a top-down view of the final focusing mirror shape. The mirror includes reflectors 4601 separated by middle line 4303. The width of middle line 4303 is the width of opening W. The middle line 4303 also separates the first regions (see, FIG. 16C) which are comprised of the same material as the reflectors 4601. Thus, the first regions and reflectors are shown being formed together in FIGS. 43-46. The two-step process of FIGS. 43-46 enables formation of a straight edge on a side-coupling feature (e.g., focusing mirror), which maintains the ABS opening width W, within a certain lapping range (i.e., portion of the length of the straight edged portion 4303). This allows for the definition of the ABS opening through an additional lithography step, so that the ABS opening (and performance variation based on ABS opening) can be accurately controlled.

As described above, the formation of a side-coupling structure, such as a subwavelength-sized focusing mirror, proximate an NFT and recessed from the media-facing surface improves near-field transducer performance (i.e., efficiency, thermal gradient, etc.) of a recording head. The structures recycle optical energy residing in the waveguide near the distal end of the near-field transducer and can convert residual transverse electric field components to a longitudinal one to boost the near-field performance.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination and are not meant to be limiting, but purely illustrative. It is intended that the scope of the invention be limited not with this detailed description, but rather, determined by the claims appended hereto.

What is claimed is:
1. A recording head, comprising:
   a near-field transducer (NFT) comprising a peg, where the peg has a distal end positioned proximate a media-facing surface of the recording head;

a waveguide that overlaps and delivers light to the near-field transducer; and a subwavelength-sized focusing mirror comprising first and second reflectors on cross track sides of the near-field transducer, wherein the first reflector has an NFT-facing side that varies in distance spaced apart from the NFT and the second reflector has an NFT-facing side that varies in distance spaced apart from the NFT corresponding to the varying distance of the first NFT-facing side and each of the first and second NFT-facing sides begin at a first position spaced apart from the distal end of the peg by a distance, D, measured along an axis normal to the media-facing surface, where the distal end of the peg is closer to the media-facing surface than the first position, and end at a second position spaced apart from the media-facing surface greater than D along the axis normal to the media-facing surface where each of the first and second reflectors has a distal side opposite and parallel to the media-facing surface and coupled to the NFT-facing side at the second position.

2. The recording head of claim 1, wherein D is between about 10 nm and about 60 nm.

3. The recording head of claim 1, wherein D is between about 20 nm and about 50 nm.

4. The recording head of claim 1, wherein the near-field transducer extends farther away from the media-facing surface than the first and second reflectors.

5. The recording head of claim 1, further comprising a high-index core material of the waveguide is disposed in first regions between the first and second reflectors and the media-facing surface.

6. The recording head of claim 1, further comprising a material disposed in first regions between the first and second reflectors and the media-facing surface, wherein the material has a refractive index lower than a refractive index of a core material of the waveguide.

7. The recording head of claim 1, further comprising first regions between the first and second reflectors and the media-facing surface, wherein edges of the first regions proximate to the NFT are one or both of substantially straight and laterally offset with respect to the first position of the first and second NFT-facing sides.

8. The recording head of claim 1, wherein:
the first reflector has a first side proximate to the media-facing surface and the distal side is opposite the first side; and
the second reflector has a first side proximate to the media-facing surface and the distal side is opposite the first side, wherein a high-index core material of the waveguide is disposed proximate to the distal side of the first reflector and the high-index core material of the waveguide is disposed proximate to the distal side of the second reflector.

9. The recording head of claim 1, wherein the NFT-facing sides of the first and second reflectors are substantially straight.

10. The recording head of claim 1, wherein the NFT-facing sides of the first and second reflectors are curved.

11. The recording head of claim 10, wherein the NFT-facing sides of the first and second reflectors are parabolic or circular.

12. The recording head of claim 1, wherein the NFT-facing sides of the first and second reflectors follow a contour of the proximate sides of the near-field transducer.

13. The recording head of claim 1, wherein the NFT-facing sides of each of the first and second reflectors couple to a contiguous portion proximate the media-facing surface that extends in a substantially straight direction normal to the media-facing surface from the first position.

14. The recording head of claim 1, wherein:
the first and second reflectors have corners proximate to the near-field transducer and the media-facing surface; and
one or more of the corners has a radius of curvature in a range of about 20 nm to about 200 nm.

15. The recording head of claim 1, wherein:
a distance, as measured along an axis normal to the media-facing surface, between an end of the near-field transducer proximate to the media-facing surface and the first position is less than about 40 nm.

16. The recording head of claim 14, wherein:
the first reflector has a first side proximate to the media-facing surface and a distance, as measured along an axis normal to the media-facing surface, between an end of the near-field transducer proximate to the media-facing surface and the first side of the first reflector is less than about 20 nm; and
the second reflector has a first side proximate to the media-facing surface, and a distance, measured along an axis normal to the media-facing surface, between an end of the near-field transducer proximate to the media-surface and the first side of the second reflector is less than about 20 nm.

17. The recording head of claim 1, wherein:
the near-field transducer has a first side proximate to the media-facing surface, a second side opposite the first side, and a height measured between the first side and the second side along an axis normal to the media-facing surface;
the NFT-facing side of the first reflector has a height measured between the first position and the second position along an axis normal to the media-facing surface; and
the NFT-facing side of the second reflector has a height measured between the first position and the second position along an axis normal to the media-facing surface, wherein the height of the first reflector added to D is about half of the height of the near-field transducer and the height of the second reflector added to D is about half of the height of the near-field transducer.

18. A recording head, comprising:
a near-field transducer (NFT) comprising a peg, where the peg has a distal end positioned proximate a media-facing surface of the recording head;
a waveguide that overlaps and delivers light to the near-field transducer; and
a subwavelength focusing mirror comprising first and second reflectors on cross track sides of the near-field transducer, wherein the first reflector has an NFT-facing side that varies in distance spaced apart from the NFT and the second reflector has an NFT-facing side that varies in distance spaced apart from the NFT corresponding to the varying distance of the first NFT-facing side and each of the NFT-facing sides begin at a first position spaced apart from the distal end of the peg by a distance, D, as measured along an axis normal to the media-facing surface, where the distal end of the peg is closer to the media-facing surface than the first position, and end at a second position spaced apart from the media-facing surface greater than D along the axis normal to the media-facing surface, wherein D is about 5% to about 10% of a height of the near-field transducer as measured along the axis normal to the media-facing surface where each of the first and second reflectors has a distal side opposite and parallel to the media-facing surface and coupled to the NFT-facing side at the second position.

19. The recording head of claim 18, wherein a corner of at least one of the first reflector and the second reflector proximate to the near-field transducer has a radius of curvature in a range of about 20 nm to about 200 nm.

20. The recording head of claim 18, wherein D is between about 10 nm and about 60 nm.

* * * * *